(12) United States Patent
Brunswick et al.

(10) Patent No.: US 6,966,691 B2
(45) Date of Patent: Nov. 22, 2005

(54) MIXER WITH PIVOTABLE BOWL

(75) Inventors: Brian A. Brunswick, Troy, OH (US);
Joseph C. Huang, Dayton, OH (US);
Brian E. Bader, Springfield, OH (US);
John C. Baron, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 10/451,982

(22) PCT Filed: Oct. 24, 2002

(86) PCT No.: PCT/US02/34109

§ 371 (c)(1),
(2), (4) Date: Sep. 24, 2003

(87) PCT Pub. No.: WO03/037494

PCT Pub. Date: May 8, 2003

(65) Prior Publication Data

US 2005/0002272 A1 Jan. 6, 2005

Related U.S. Application Data

(63) Continuation-in-part of application No. 10/039,930, filed on Oct. 27, 2001, which is a continuation-in-part of application No. 09/561,828, filed on Apr. 28, 2000, now Pat. No. 6,494,610.

(51) Int. Cl.[7] .................................................. B01F 7/16
(52) U.S. Cl. ....................................................... 366/207
(58) Field of Search ................................ 366/288, 349, 366/96–98, 189, 197–199, 203, 206, 207, 220; 220/735–736, 741, 742, 751, 480–481, 475, 770, 756, 759, 758, 773; 16/425

(56) References Cited

U.S. PATENT DOCUMENTS

| 32,482 A | 6/1861 | Lane | |
|---|---|---|---|
| 140,527 A | * 7/1873 | Munson, Jr. | 220/758 |
| 227,239 A | 5/1880 | Frentress | |
| 320,255 A | 6/1885 | Jackman | |

(Continued)

FOREIGN PATENT DOCUMENTS

| DE | 1070563 | | 12/1959 |
|---|---|---|---|
| DE | 1298510 | | 7/1969 |
| EP | 1027920 A1 | * | 8/2000 |
| EP | 1151669 | | 7/2001 |
| FR | 1079799 | | 5/1954 |
| FR | 2728485 | | 6/1996 |
| FR | 2740064 A1 | * | 4/1997 |
| FR | 2805177 | * | 8/2004 |
| GB | 120393 | | 3/1919 |
| GB | 672619 | | 5/1952 |
| JP | 11-347390 | * | 12/1999 |
| WO | WO 96/30114 | | 10/1996 |

OTHER PUBLICATIONS

Service Manual, *Models H–600 and H–600–T and L–800 Mixers*, Hobart Corporation (Jul. 1977).

(Continued)

*Primary Examiner*—Charles E. Cooley
(74) *Attorney, Agent, or Firm*—Thompson Hine LLP

(57) ABSTRACT

A mixer system including a bowl for receiving a material to be mixed, a mixer body having a rotatable output component, and a hinge. The bowl is pivotable about the hinge relative to the mixer body such the bowl can be pivoted between a loading/unloading position and a closed position relative the mixer body. The mixer system further includes a locking mechanism located at least partially on one of the bowl or the mixer body, the locking mechanism being normally biased into a locking position. At least a portion the bowl or the mixer body interacts with the locking mechanism to move the locking mechanism toward the release position to allow the bowl to move to the closed position, the locking mechanism being movable back toward the locking position when the bowl is in the closed position to retain the bowl in the closed position.

45 Claims, 24 Drawing Sheets

U.S. PATENT DOCUMENTS

| | | | | |
|---|---|---|---|---|
| 613,888 | A | * 11/1898 | Schmuck | 220/814 |
| 735,353 | A | 8/1903 | Eifert | |
| 760,693 | A | 5/1904 | Lancaster et al. | |
| 826,223 | A | 7/1906 | Broadwell | |
| 879,590 | A | 2/1908 | Roth | |
| 910,648 | A | * 1/1909 | Davison | 220/759 |
| 1,143,484 | A | * 6/1915 | Beach | 220/759 |
| 1,264,128 | A | 4/1918 | Rataiczak | |
| 1,366,114 | A | 1/1921 | Boggs | |
| 1,415,735 | A | 5/1922 | Trust et al. | |
| 1,428,704 | A | 9/1922 | Petri | |
| 1,468,615 | A | 9/1923 | Guttenstein et al. | |
| 1,548,041 | A | 8/1925 | Johnston et al. | |
| 1,548,919 | A | 8/1925 | Ward | |
| 1,562,704 | A | 11/1925 | Kevan | |
| 1,634,777 | A | * 7/1927 | Girdler | 220/480 |
| 1,695,345 | A | 12/1928 | Read | |
| 1,733,945 | A | 10/1929 | Dehuff | |
| 1,743,271 | A | 1/1930 | Gould | |
| 1,761,237 | A | 6/1930 | Schiff | |
| 1,767,002 | A | 6/1930 | Johnston et al. | |
| 1,774,509 | A | 9/1930 | Gould | |
| 1,781,321 | A | 11/1930 | Dehuff | |
| 1,807,589 | A | * 6/1931 | Edmunds | 220/475 |
| 2,024,282 | A | 12/1935 | Geiger | |
| 2,122,628 | A | * 7/1938 | Tracy | 220/740 |
| 2,181,079 | A | 11/1939 | Dehuff | |
| 2,251,903 | A | 8/1941 | Anstice et al. | |
| 2,613,847 | A | * 10/1952 | Lacher | 220/754 |
| 3,073,493 | A | * 1/1963 | Pfaffenberger | 220/741 |
| 3,075,746 | A | 1/1963 | Yablonski et al. | |
| 3,255,913 | A | * 6/1966 | Helm | 220/475 |
| 3,533,603 | A | 10/1970 | Kovacs | |
| 3,633,719 | A | 1/1972 | Lynch | |
| 3,758,183 | A | 9/1973 | Steinkamp et al. | |
| 4,042,221 | A | 8/1977 | Myers et al. | |
| 4,135,828 | A | * 1/1979 | Cabak | 366/197 |
| 4,173,925 | A | 11/1979 | Leon | |
| 4,283,148 | A | 8/1981 | Peterson | |
| 4,402,466 | A | 9/1983 | Schmidt | |
| 4,765,746 | A | 8/1988 | Suay Puig | |
| 4,823,633 | A | 4/1989 | Pike | |
| 4,854,711 | A | * 8/1989 | Hagan | 366/46 |
| 4,937,916 | A | 7/1990 | Redman | |
| 4,946,285 | A | 8/1990 | Vennemeyer | |
| 5,048,709 | A | * 9/1991 | Alverson | 220/709 |
| 5,123,747 | A | * 6/1992 | Derksen | 366/197 |
| 5,157,983 | A | 10/1992 | Sankovic | |
| 5,306,083 | A | 4/1994 | Caldwell et al. | |
| 5,325,980 | A | * 7/1994 | Grimm et al. | 220/212 |
| 5,325,982 | A | * 7/1994 | Cobb, Jr. | 220/212.5 |
| 5,409,149 | A | 4/1995 | Hough | |
| 5,472,276 | A | 12/1995 | Ratermann et al. | |
| 5,494,350 | A | 2/1996 | Childress | |
| 5,653,535 | A | 8/1997 | Xie et al. | |
| 5,690,427 | A | 11/1997 | Jennings | |
| 5,806,704 | A | * 9/1998 | Jamison | 220/212 |
| 5,860,738 | A | 1/1999 | Brinkman | |
| 5,934,802 | A | 8/1999 | Xie | |
| 6,092,647 | A | * 7/2000 | Yeh et al. | 220/756 |
| 6,494,610 | B1 | * 12/2002 | Brunswick | 366/207 |
| 6,595,680 | B2 | * 7/2003 | Sanpei et al. | 366/147 |
| 6,883,959 | B2 | * 4/2005 | Donthnier et al. | 366/203 |
| 2002/0093877 | A1 | 7/2002 | Brunswick et al. | |
| 2002/0181322 | A1 | * 12/2002 | Brunswick et al. | 366/197 |
| 2004/0120213 | A1 | * 6/2004 | Short et al. | 366/197 |
| 2004/0120215 | A1 | * 6/2004 | Huang et al. | 366/203 |
| 2004/0120216 | A1 | * 6/2004 | Donthnier et al. | 366/203 |
| 2004/0208082 | A1 | * 10/2004 | Huang et al. | 366/206 |
| 2005/0002272 | A1 | * 1/2005 | Brunswick et al. | 366/207 |
| 2005/0141340 | A1 | * 6/2005 | Donthnier et al. | 366/207 |

OTHER PUBLICATIONS

Instructions Manual, *H600 & L800 Mixers*, Hobart Corporation (Dec. 1999).

*Varimixer Food Mixer Model W60* (2 pages), A Welbilt Company (Sep. 1996).

*100% Gear Transmission Mixer* (1 page); American Eagle Food Machinery, Inc. (date unknown).

*The Best Values Just Got Better* (3 pages), Univex (date unknown).

*Heavy Duty Dough Mixers* (3 pages), Spar Mixer (date unknown).

*EM20 Heavy Duty Professional 20 Quart Mixer* (1 page), Dito Dean Food Prep (date unknown).

*Instruction Manual . . . with Catalog of Replacement Parts—Hobart Models A–200 and A–200T Mixers* (15 pages), The Hobart Manufacturing Company (Feb. 1996).

* cited by examiner

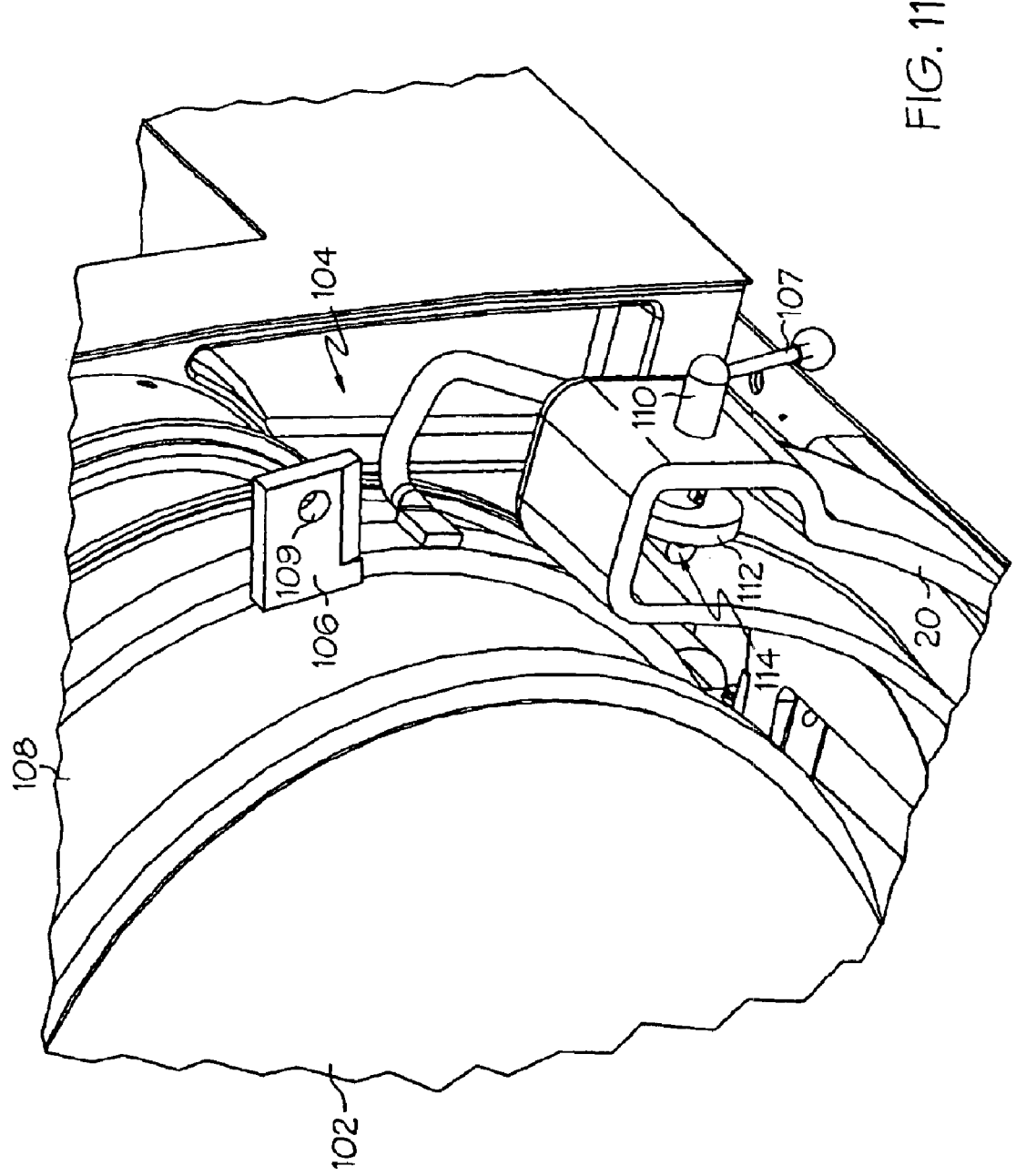

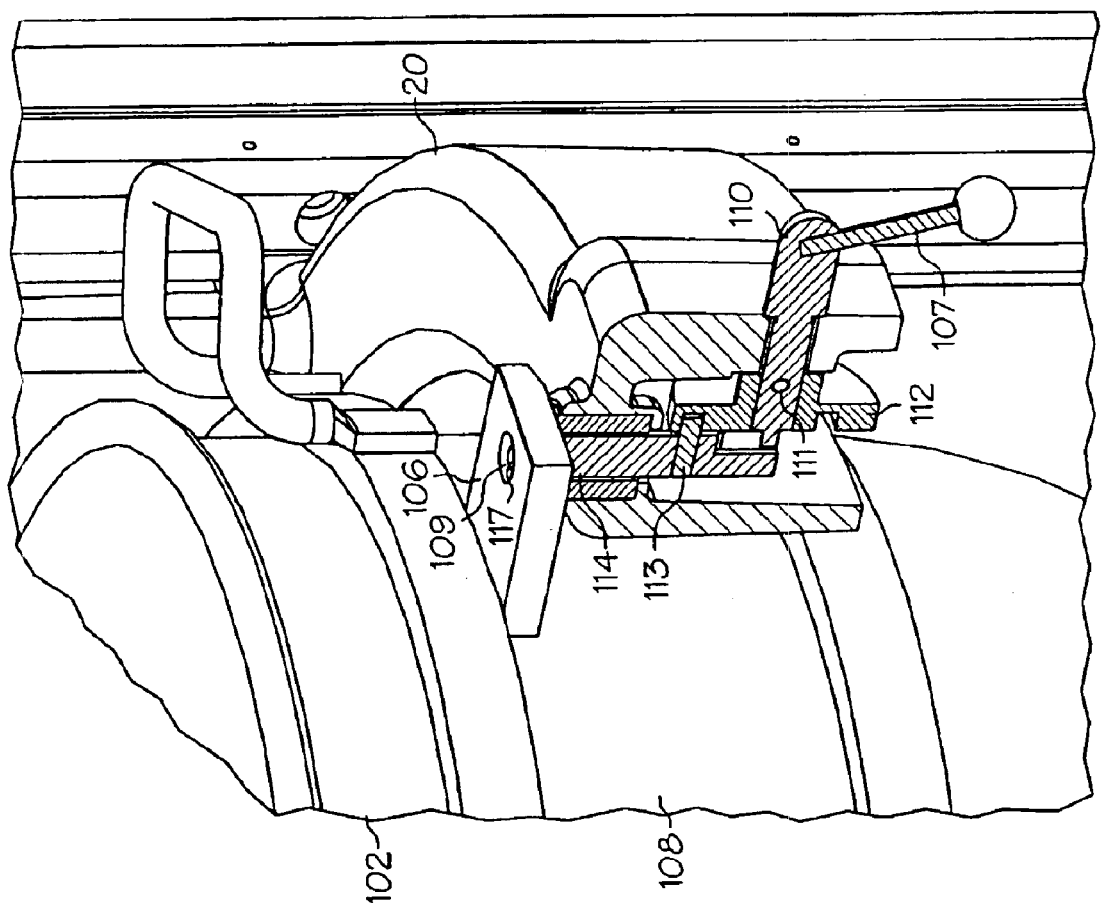

MIXER WITH PIVOTABLE BOWL

CROSS-REFERENCES TO RELATED APPLICATIONS

This application is a 35 U.S.C. §371 national stage application claiming the benefit of priority of PCT/US02/34109, filed Oct. 24, 2002, which is a continuation-in-part of U.S. application Ser. No. 10/039,930, filed Oct. 27, 2001, which is in turn is a continuation-in-part of U.S. application Ser. No. 09/561,828, filed Apr. 28, 2000, now U.S. Pat. No. 6,494,610 B1, the contents of these which are hereby incorporated by reference.

BACKGROUND

The present invention is directed to a bowl that can be pivotally coupled to a mixer, and to a mixer system having a pivotable bowl.

Mixers are used to mix and blend a wide variety of materials. The mixers typically include a mixer body having a motor that drives a generally vertically-extending mixing element, and a bowl that is located below the mixing element. The bowl receives the materials to be mixed and the lower end of the rotatable mixing element therein. The bowl is typically detachable from the mixer body to aid in loading and unloading the materials into the bowl, and to enable cleaning, repair or replacement of the bowl.

In some mixers, the mixer bowl is vertically movable relative to the body such that the bowl can be lowered away from the mixing element. The materials to be mixed can then be added to or removed from the bowl while the bowl is in its lowered position. However, even after the bowl is lowered, it may be difficult to access the bowl to add or remove materials from the bowl due to the location and orientation of the overhang portion of the mixer body relative to the bowl.

SUMMARY

The present invention is a mixer having a bowl that is pivotally coupled to the mixer body. The pivotable nature of the bowl may enable the bowl to pivot away from the mixer body, which can provide convenient access to the bowl. The bowl can also be quickly and easily coupled to, and uncoupled from, the mixer body. The bowl may include a locking mechanism to retain the bowl in place and to prevent undesired pivotable motion of the bowl.

In one embodiment, the invention is a mixer system including a bowl for receiving a material to be mixed, a mixer body having a rotatable output component, and a hinge. The bowl is pivotable about the hinge relative to the mixer body such that the bowl can be pivoted between a loading/unloading position and a closed position relative the mixer body. The mixer system further includes a locking mechanism located at least partially on one of the bowl or the mixer body, the locking mechanism being normally biased into a locking position. At least a portion the bowl or the mixer body interacts with the locking mechanism to move the locking mechanism toward the release position to allow the bowl to move to the closed position, the locking mechanism being movable back toward the locking position when the bowl is in the closed position to retain the bowl in the closed position.

Other objects and advantages of the present invention will be apparent from the following description and the accompanying drawings.

BRIEF DESCRIPTION OF THE DRAWINGS

FIG. 11 is a bottom detail perspective view of the bowl, yoke, and part of the mixer body of FIG. 9;

FIG. 12 is a perspective partial cross section of the locking mechanism of the mixer of FIG. 9;

DETAILED DESCRIPTION

Figure 1:
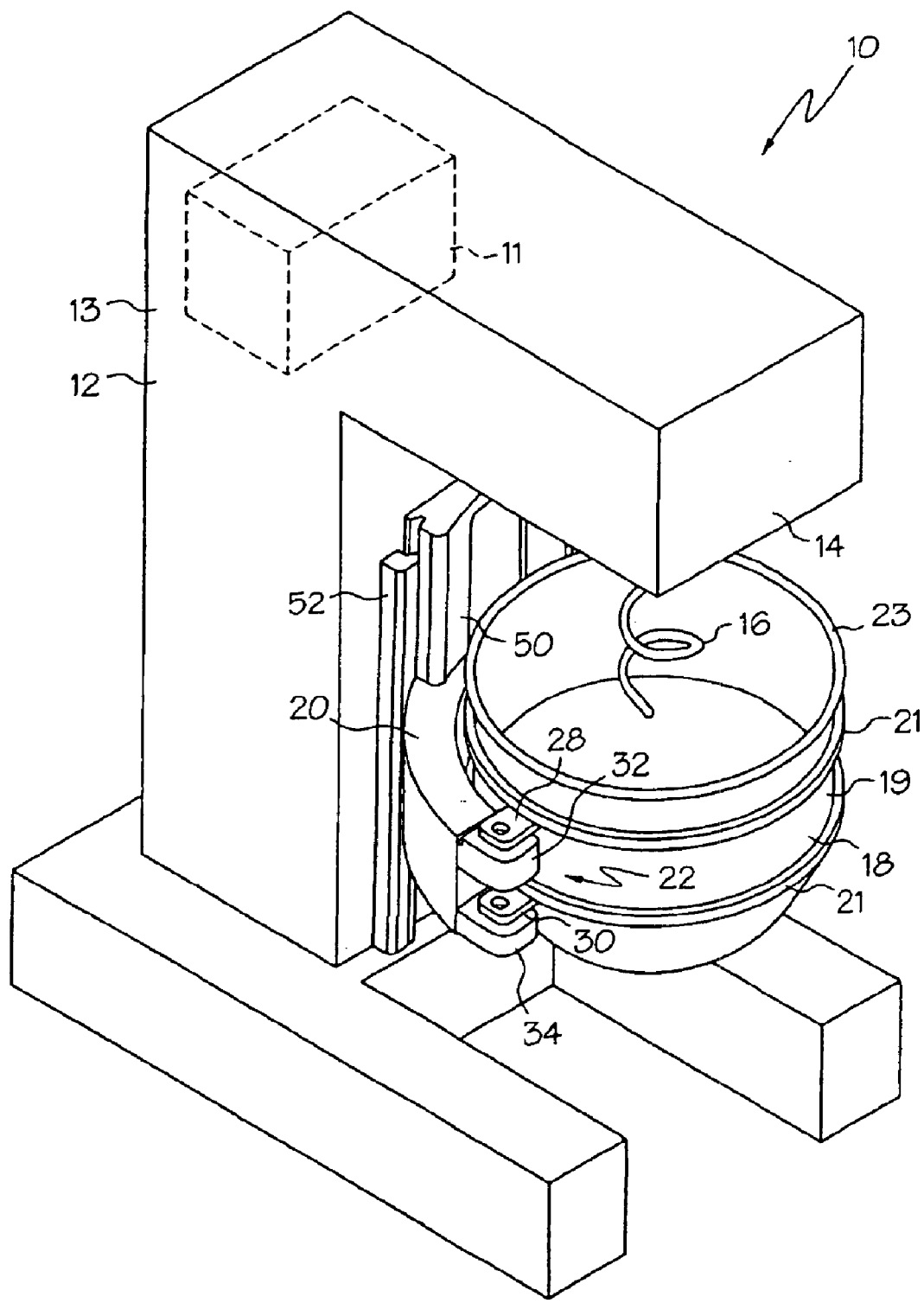
FIG. 1 is a perspective view of one embodiment of the mixer of the present invention.

FIG. 1 illustrates a mixer, generally designated 10, which includes a mixer body 12 having a generally vertically-extending main portion 13 and an overhang portion or transmission head 14. The mixer body 12 includes a yoke 20 coupled to the main portion 13 of the mixer body 12. The yoke 20 is generally semicircular in top view, and is shaped to closely receive a mixer bowl 18 therein. The yoke 20 is coupled to a vertically movable yoke base 50, and the yoke base 50 is vertically movable along a pair of guide rails 52, 54.

Figure 8:
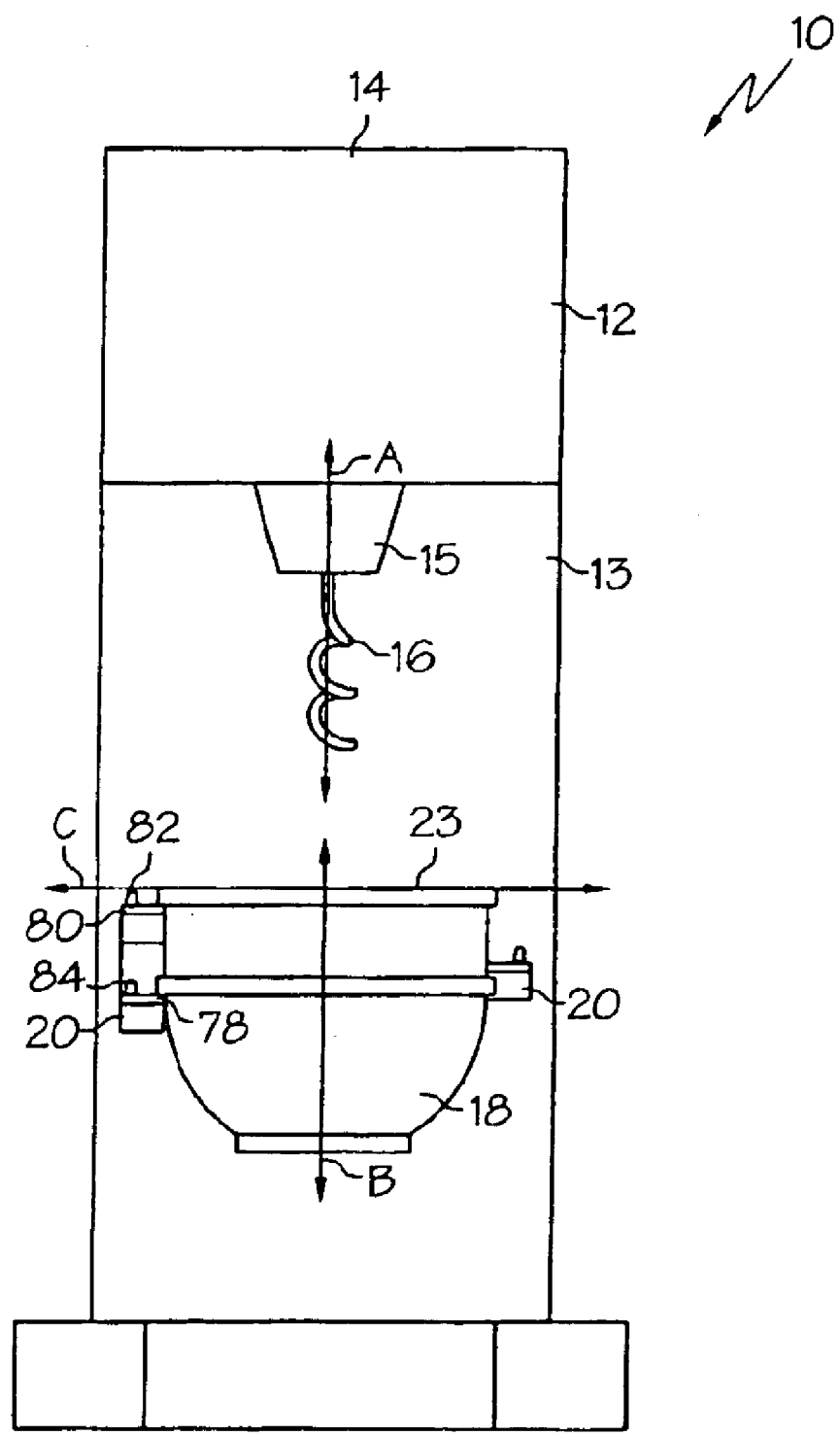
FIG. 8 is a front view schematic representation of the mixer of FIG. 1.

The mixer 10 includes a motor or mixing drive 11 housed in the mixer body 12. The mixing drive 11 is drivingly coupled to an output component 15 (see FIG. 8) to rotate the output component about its central axis A. The mixer 10 may include a generally downwardly-extending mixing element 16 (such as a dough hook) that is removably connected to the output component 15. The mixing element 16 can be any of a wide variety of shapes and can be coupled to the output component 15 by a wide variety of attachment mechanisms, such as a bayonet-style attachment (not shown) as is well known in the art. The output component 15 may be or include a planetary gear system. In this case, the central axis A of the output component 15 is the central axis about which the planetary gears orbit, and the output component 16 may rotate about its own axis and orbit about the axis A.

The bowl 18 is shaped to be mounted to the yoke 20 of the mixer body 12 such that the bowl 18 is closely received in the yoke 20. The bowl 18 includes a bowl body 19 that contains the materials to be mixed (not shown), and a top rim or edge 23 that forms a plane C. The bowl 18 includes a central axis B that is generally perpendicular to the plane C. The bowl 18 also includes pair of vertically spaced bands 21, each band 21 being attached to the bowl body 19, such as by spot welding or other attachment methods.

Figure 2:
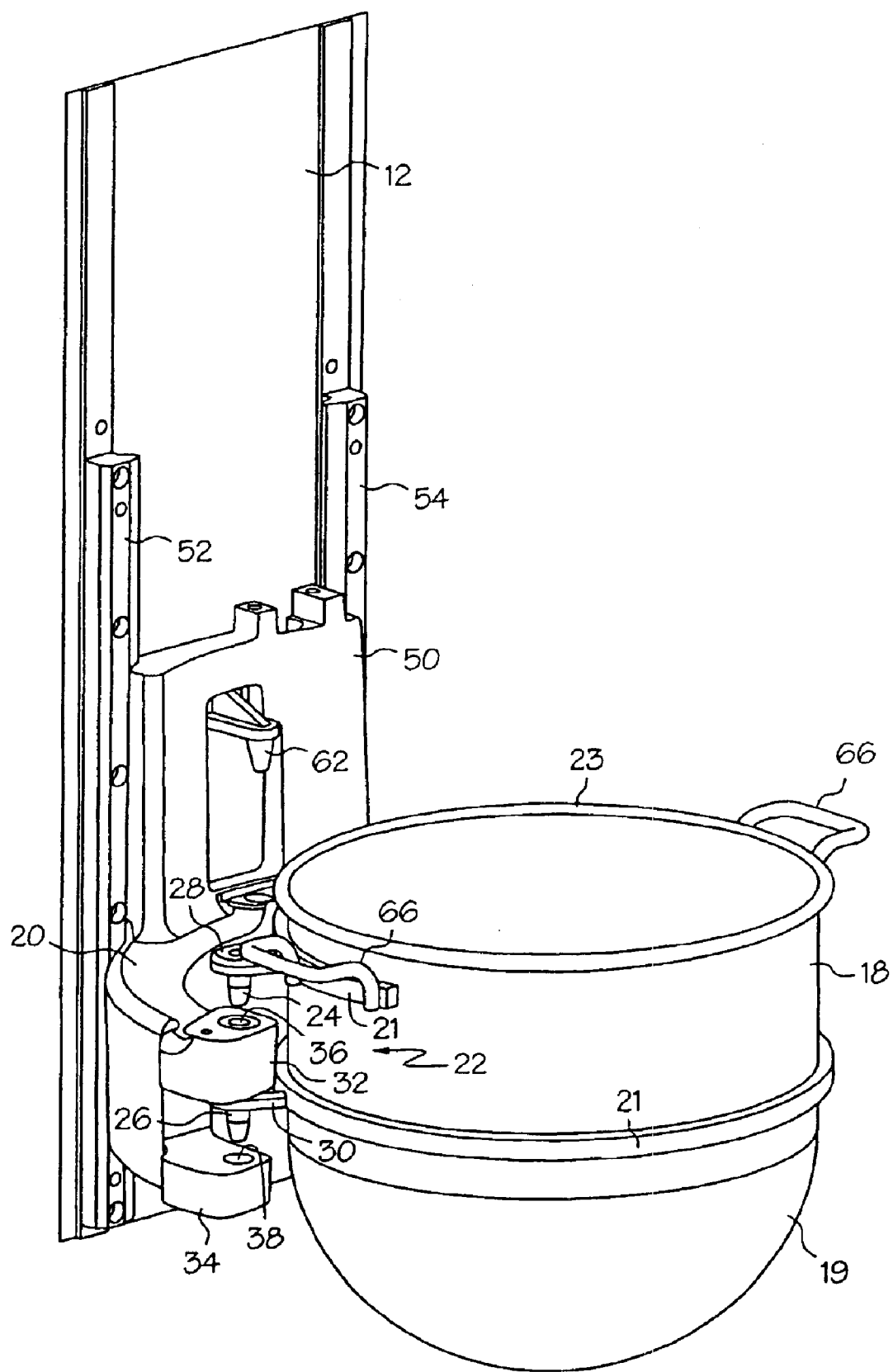
FIG. 2 is a perspective view of the bowl, yoke, and part of the mixer body of the mixer of FIG. 1, with the bowl being vertically spaced away from the yoke.

As shown in FIG. 2, the mixer 10 includes a mounting structure, generally designated 22, which can pivotally couple the bowl 18 to the yoke 20 and mixer body 12. In one embodiment, the mounting structure 22 includes a pair of pin arms 28, 30, each pin arm 28, 30 being coupled to and protruding outwardly from the bowl 18. Each pin arm 28,30 may be coupled to one of the bands, 21, such as by welding, and may include a pin 24, 26, extending generally downwardly from the pin arm 28, 30. In this embodiment, the mounting structure 22 may further include a pair of brackets 32, 34 that are mounted (preferably by casting) onto a distal end of the yoke 20, each bracket 32, 34 having a hole 36, 38 formed therein. As shown in FIG. 2, the pins 24, 26 are generally axially aligned with one another, as are the holes 36, 38.

Figure 3:
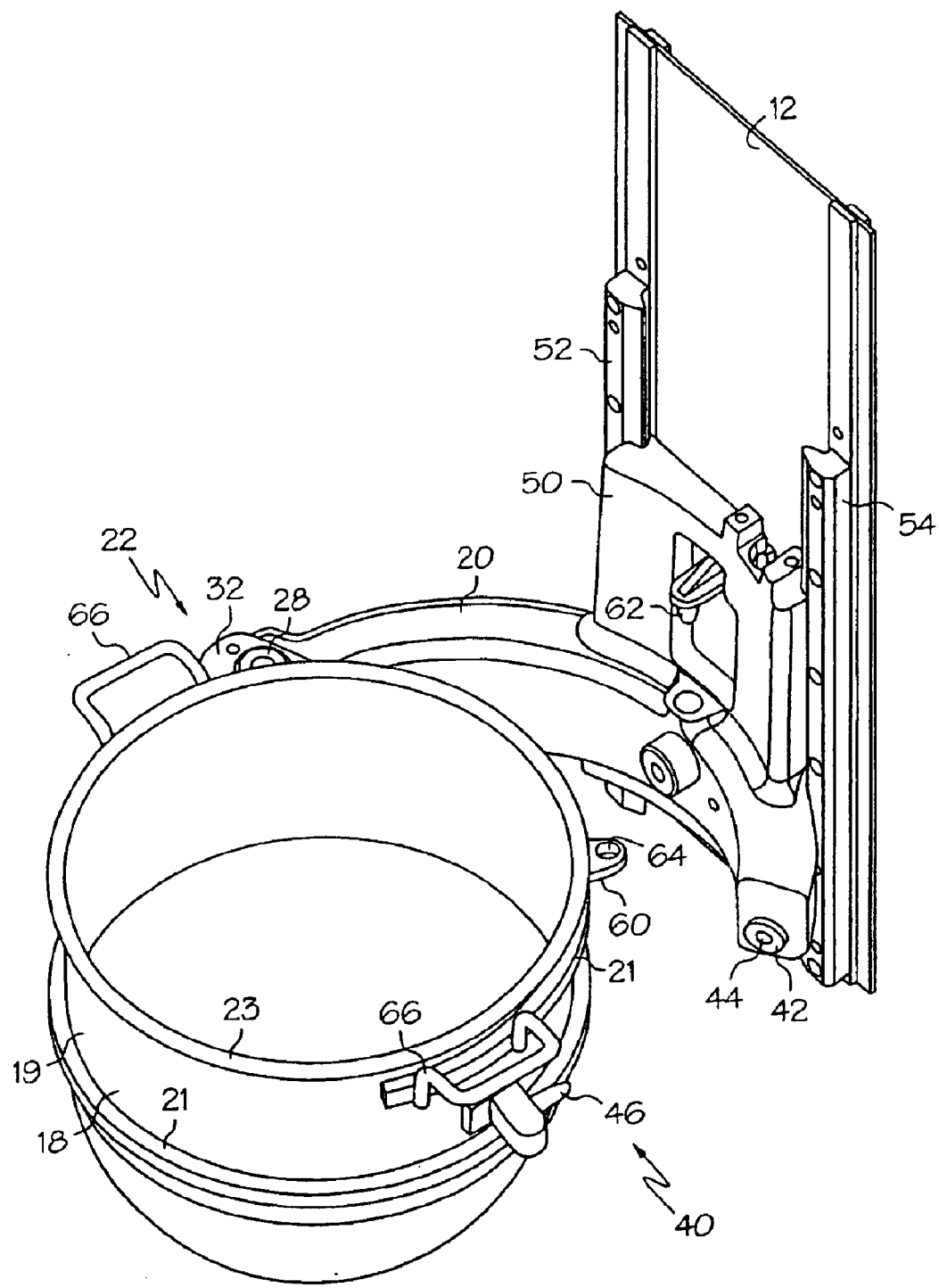
FIG. 3 is a perspective view of the bowl, yoke, and part of the mixer body of FIG. 2, with the bowl coupled to the yoke and in the loading position.

In order to mount the bowl 18 to the mixer body 12, the bowl 18 is positioned such that the pins 24, 26 are aligned with the holes 36, 38 in each bracket 32, 34, as shown in FIG. 2. The bowl 18 is then lowered such that the pins 24, 26 are received in the corresponding holes 36, 38, and the pin arms 28, 30 engage the top surface of the corresponding mounting bracket 32, 34, as shown in FIG. 3. Each pin 24, 26 preferably has a tapered tip to guide the pins 24, 26 into the mounting brackets 32, 34. After each pin 24, 26 is received in a hole 36, 38, each pin/bracket combination forms a hinge about which the bowl 18 can pivot. The bowl 18 is shown in its loading/unloading position in FIG. 3 wherein the bowl is pivoted (at least slightly) away from the mixer body 12 and yoke 20.

Figure 4:
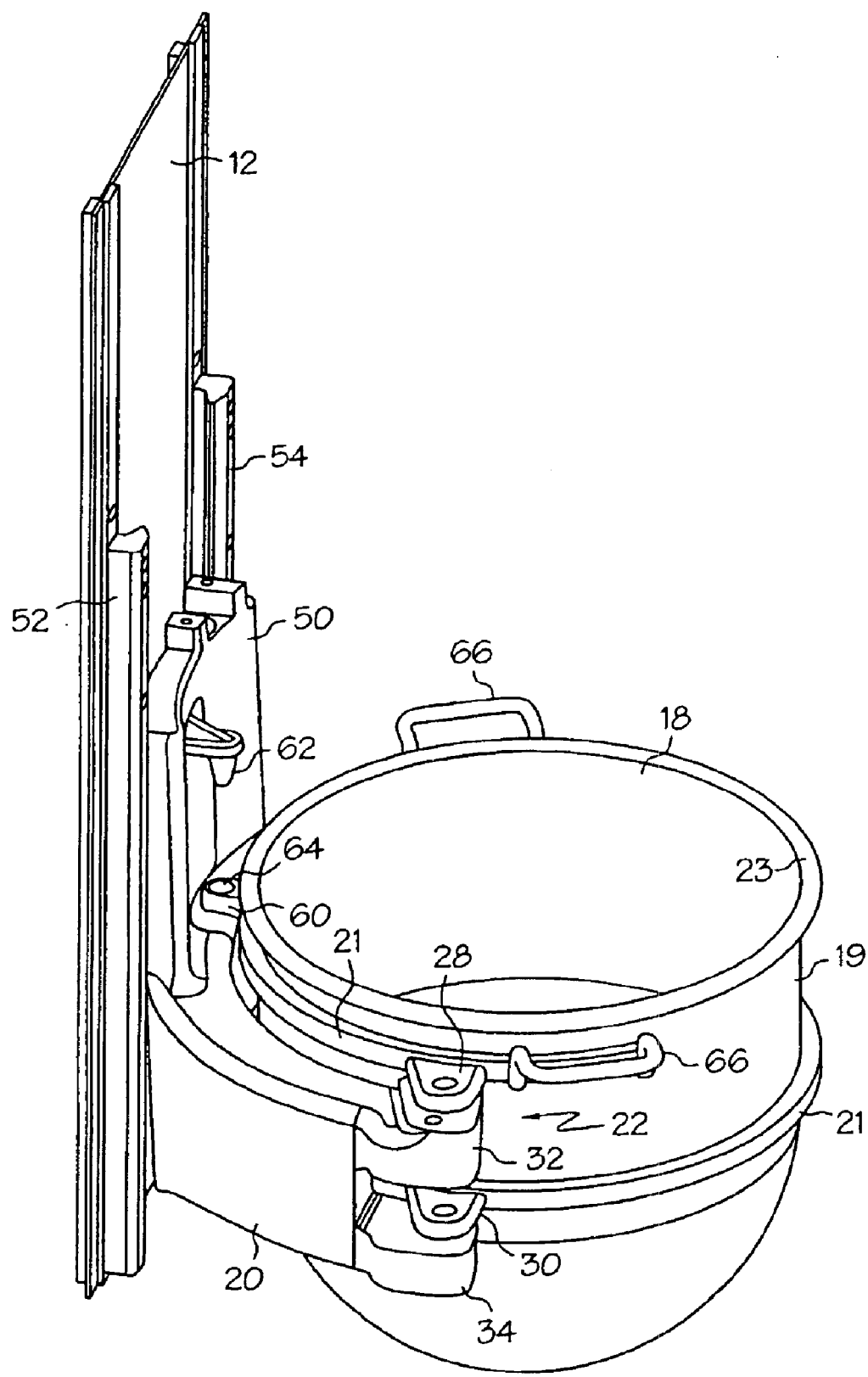
FIG. 4 is a perspective view of the bowl, yoke, and part of the mixer body of FIG. 3, with the bowl in its closed position.

After the bowl 18 is mounted to the mixer body 12, the bowl 18 can then be pivoted from its loading/unloading position of FIG. 3, to its closed position, as shown in FIG. 4. When the bowl 18 is in the closed position, the bowl 18 is located adjacent to the mixer body 12 and received within the yoke 20, and the bowl 18 is aligned such that the mixing element 16 can be received in the bowl 18 when the bowl 18 is raised relative to the mixing element 16. Furthermore, when the bowl 18 is in the closed position, the central axis B of the bowl 18 is preferably aligned with the central axis A of the output component 15, and with the central axis of the mixing element 16.

Figure 5:
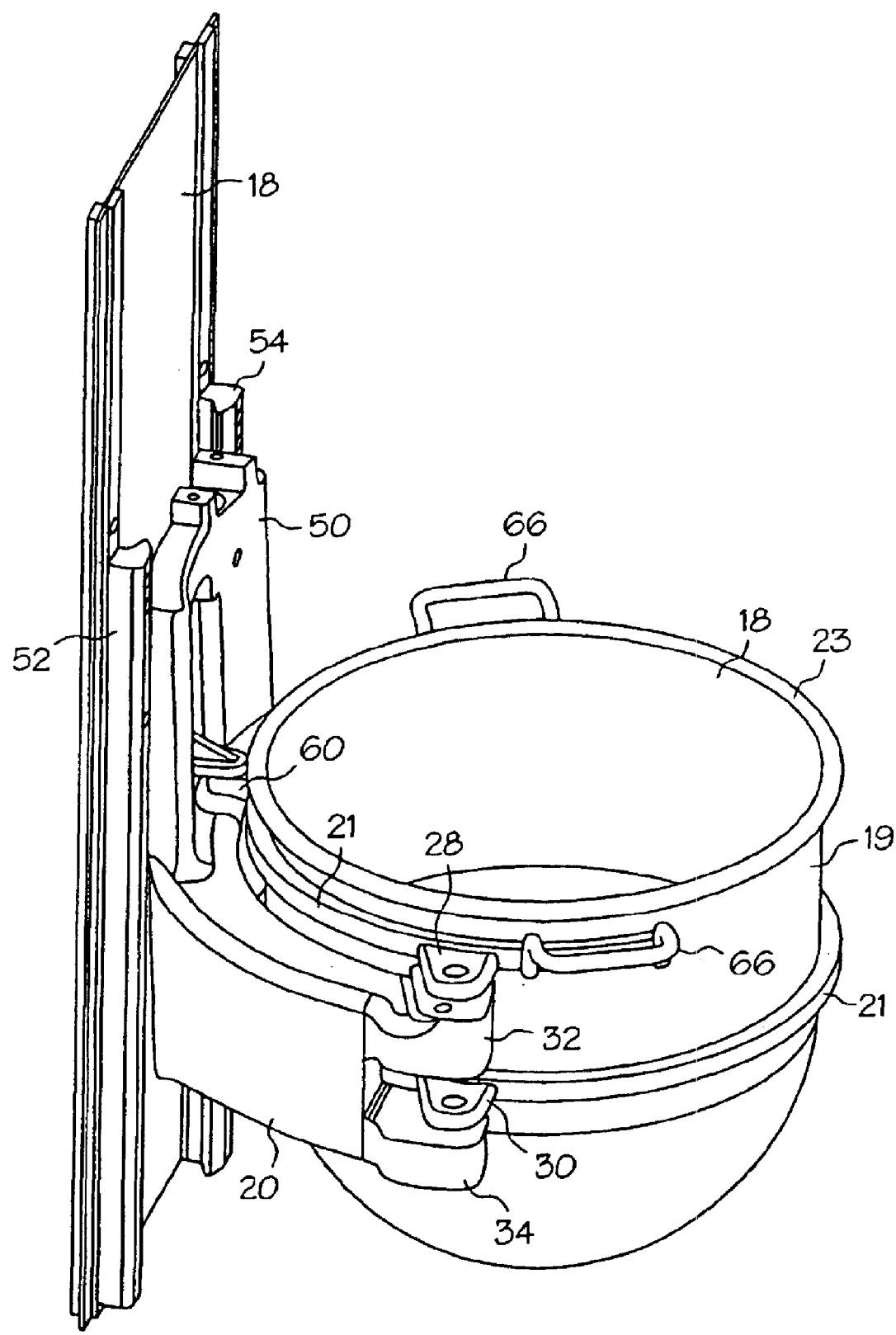
FIG. 5 is a perspective view of the bowl, yoke, and part of the mixer body of FIG. 4, with the bowl in its use position.

In order to move the bowl from its closed position (FIG. 4) to its use position (FIG. 5), the yoke 20 is raised vertically by moving the yoke base 50 along the pair of vertically-extending guide rails 52, 54. Typically, a bowl up/down drive or hand crank (not shown) is used to raise the yoke 20. As the yoke 20 is raised, the yoke 20 also raises the bowl 18 to its use position, as shown in FIGS. 1 and 5. When the bowl 18 is in the use position, the lower portion of the mixing element 16 is received in the bowl 18 such that the mixing element 16 can mix the contents of the bowl 18.

The bowl 18 may include a locking bracket 60 (FIGS. 3 and 4) having an opening 64, and the mixer body 12 may include a generally downwardly-extending locking pin 62. When the bowl 18 is moved to its use position (FIG. 5), the locking pin 62 may be received in the opening 64 of the locking bracket 60 to retain the bowl in the use position; that is, the locking pin/locking bracket combination prevents the bowl 18 from pivoting about the mounting structure 22.

Figure 6:
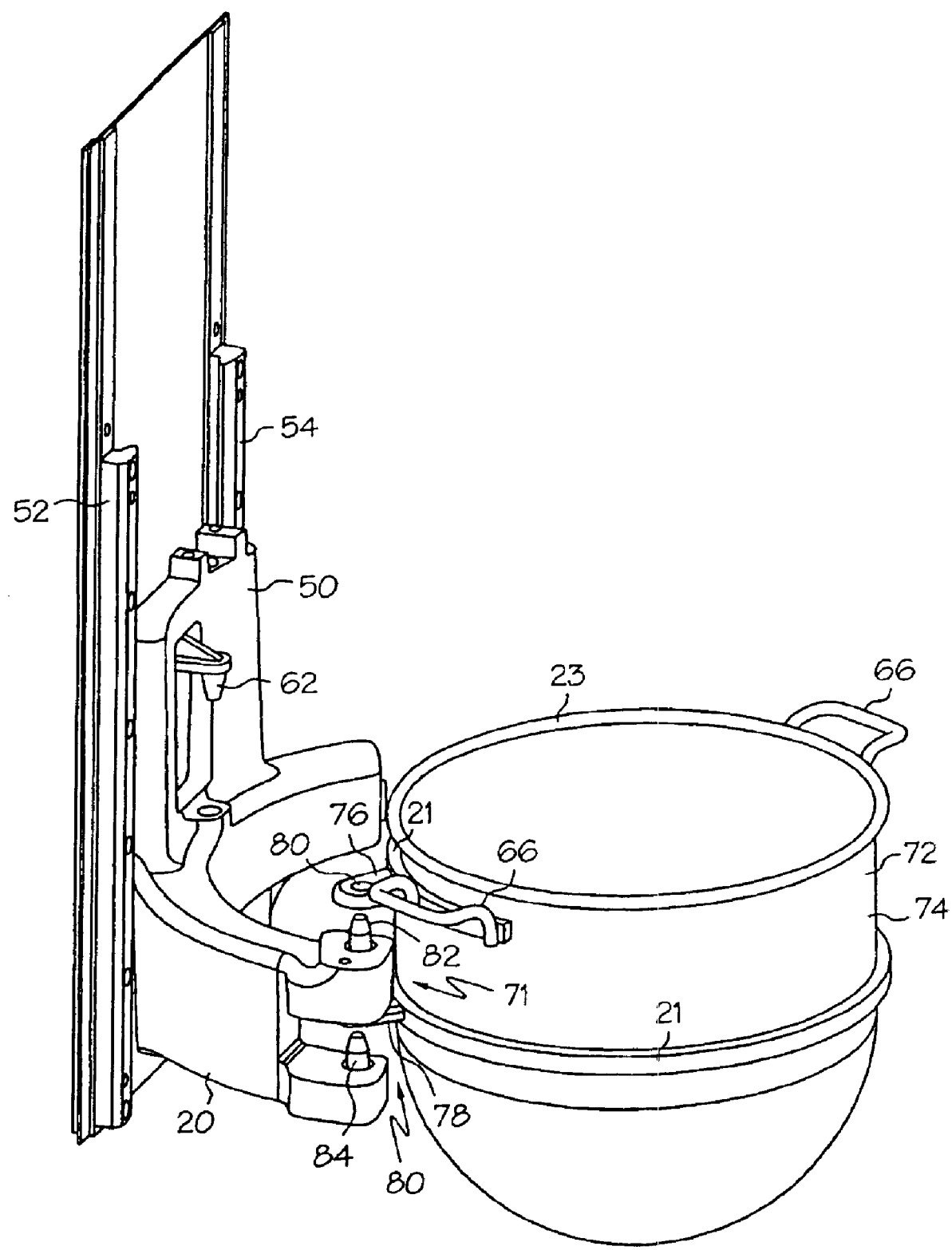
FIG. 6 is a perspective view of a bowl, yoke, and part of mixer body illustrating an alternate embodiment of the mixer of the present invention.

In another embodiment of the invention, the location of the pins and bracket may be reversed. For example, FIG. 6 illustrates a mounting structure 71 for mounting a bowl 72 to the yoke 20. In this embodiment, the bowl 72 has an outer surface 74 and a pair of brackets 76, 78 coupled to and extending outwardly from the outer surface 74. Each bracket 76, 78 may be coupled (such as by welding) to the bowl 23 (i.e., to one of the bands 21) and include a generally circular opening 80 formed therein. The mounting structure 71 further includes a pair of pins 82, 84 coupled to and extending upwardly from the yoke 20.

In order to mount the bowl 72 to the yoke 20, the brackets 76, 78 are aligned and located such that the openings 80 can each receive an associated pin 82, 84 therethrough to pivotally couple the bowl 72 to the yoke 20. After the bowl 72 is coupled to the yoke 20, the bowl 72 can be pivoted into and out of the closed position and utilized in the same manner as the bowl 18 described above. Furthermore, it should be understood that the bowl 72 need not necessarily include the brackets 76, 78, and that nearly any structure of the bowl can have the openings 80 formed therein. For example, the bowl 72 may have a lip or other mounting portion (not shown) extending wholly or partially around the perimeter of the bowl 72, and the opening or openings 80 may be located on the lip or other mounting portion. If desired, the lower pin 84 may be slightly shorter than the upper pin 82 to aid in loading and unloading the bowl 72 on the yoke 12.

Figure 7:
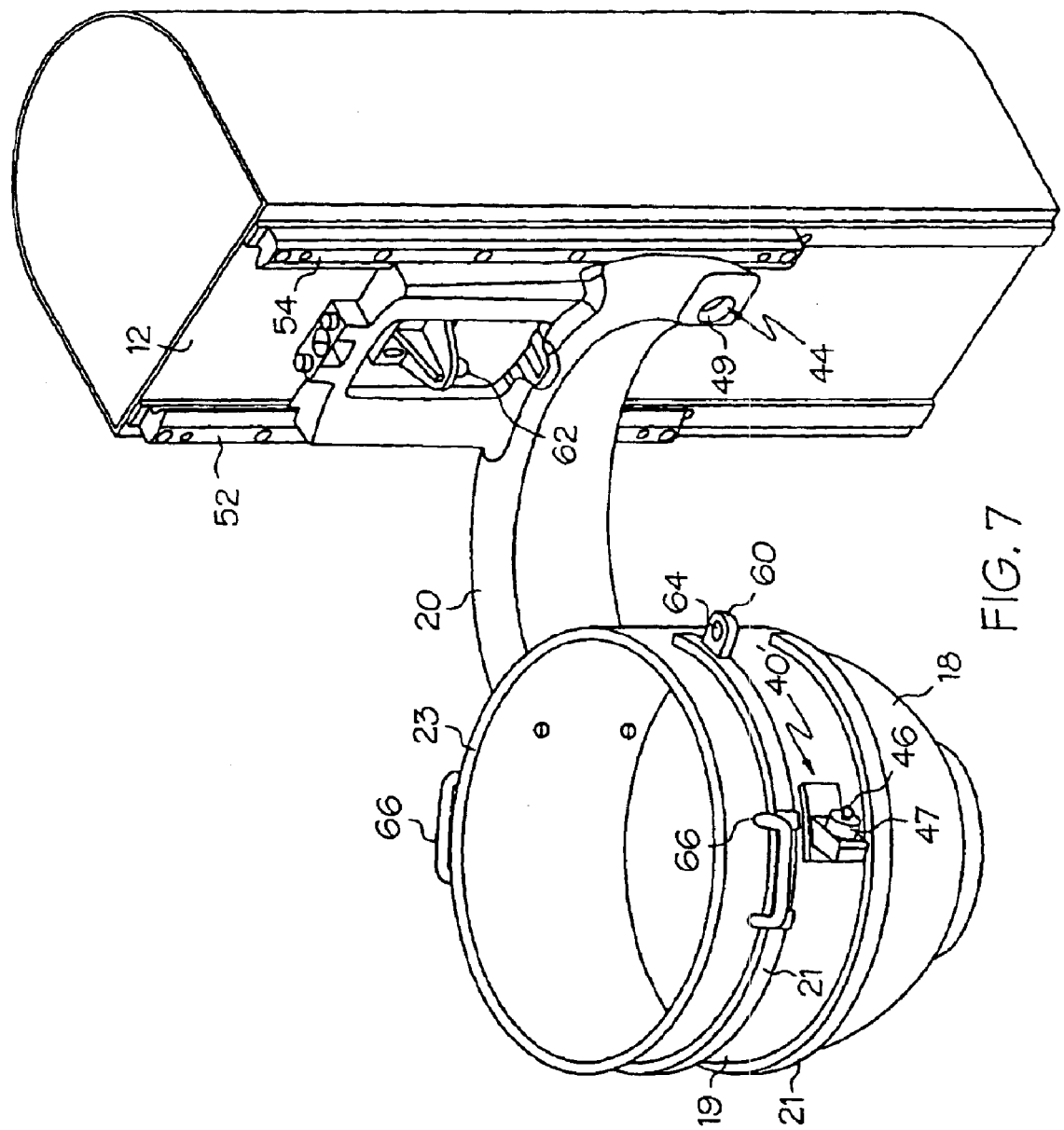
FIG. 7 is a perspective view of a bowl, yoke, and part of a mixer body illustrating a detent mechanism.

The mounting structures 22, 71 enable the bowl 18, 72 to be pivoted out from under the overhang portion 14 of the mixer body 12 to its loading/unloading position, as shown in FIG. 7. While in the loading/unloading position, the bowl 18, 72 provides easy access to the inner cavity of the bowl for loading and unloading materials in the bowl. Furthermore, when in the loading/unloading position, the handles 66 are pivoted away from the mixer body 12 and located in a convenient position for gripping.

The brackets 32, 34 or 76, 78 preferably provide sufficient support so that the central axis B of the bowl 18, 72 is generally not skewed during the pivoting motion of the bowl 18, 72 (i.e., during pivoting motion of the bowl into and out of the closed position and the loading/unloading position). More particularly, the orientation of the central axis B of the bowl 18, 72 relative to the mixer body 12 preferably does not generally move during any pivoting motion of the bowl 18, 72. Although the central axis B may be moved laterally during pivoting motion of the bowl, 18, 72 the orientation of the central axis B preferably remains generally stationary relative to the mixer body or the axis A or the axis of rotation of the mixing component 16. In one embodiment, the central axis B of the bowl 18, 72 preferably is and remains generally parallel to the central axis A of the output component 15 and the central axis of the mixing component 16 during any pivoting movement of the bowl 18, 72.

The bowl 18, 72 preferably pivots in the plane C that is defined by the upper lip or edge 23 of the bowl 18, 72 during all pivoting motion of the bowl 18, 72, and the plane C may remain generally stationary relative to the mixer body 12. This feature ensures that the bowl 18, 72 can be rotated smoothly into and out of the closed position such that the user is not required to lift the bowl during any pivoting motion of the bowl 18. The brackets 32, 34, 76, 78 and pins 24, 26, 82, 84 preferably cooperate to ensure such smooth, planar pivoting of the bowl 18, 72. For example, the brackets 32, 34 and 76, 78 may be vertically spaced apart from each other by a sufficient distance to prevent the bowl 18, 72 from tilting during its pivoting movement.

Figure 18:
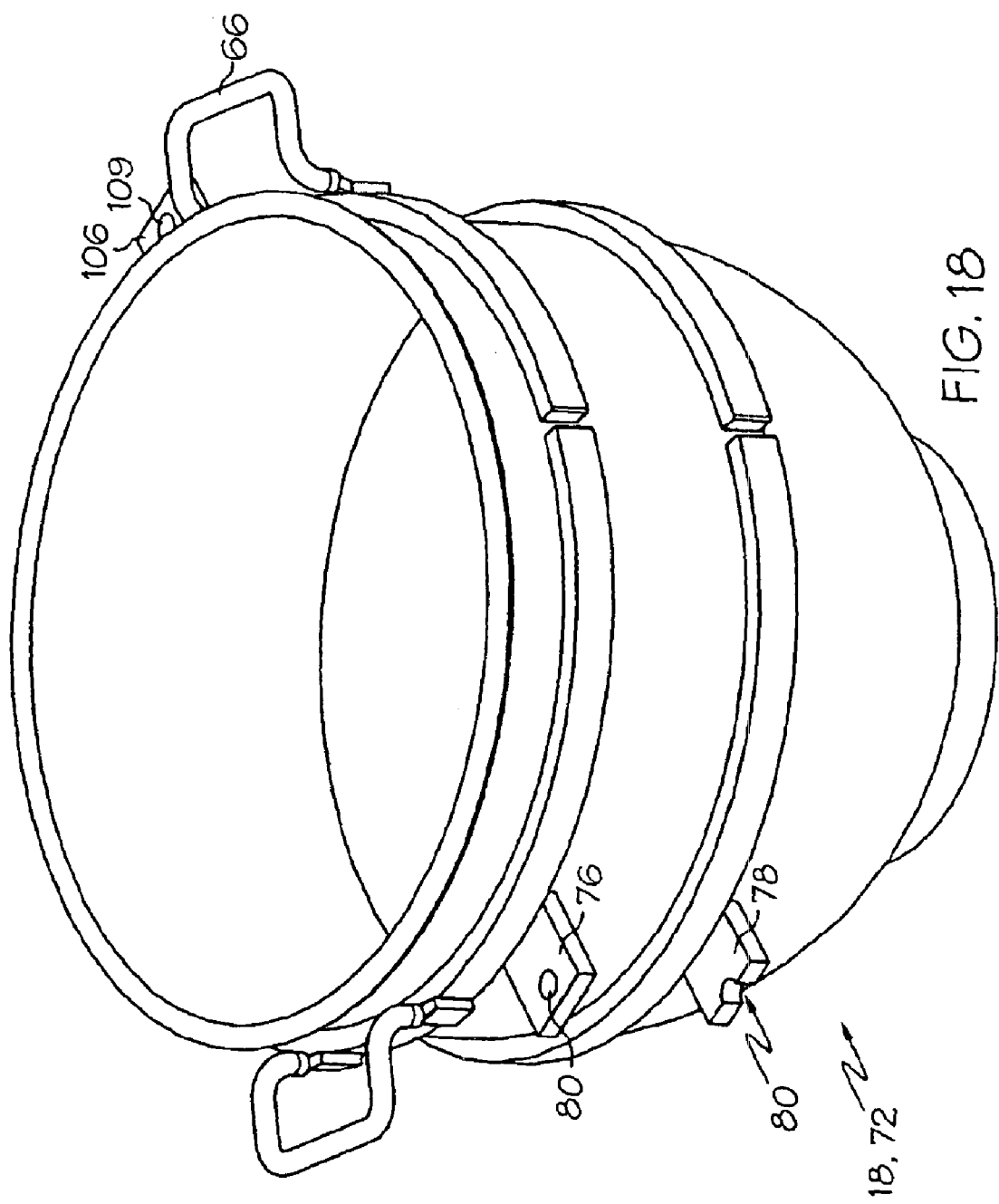
FIG. 18 is a perspective view of another embodiment of a bowl.
Figure 19:
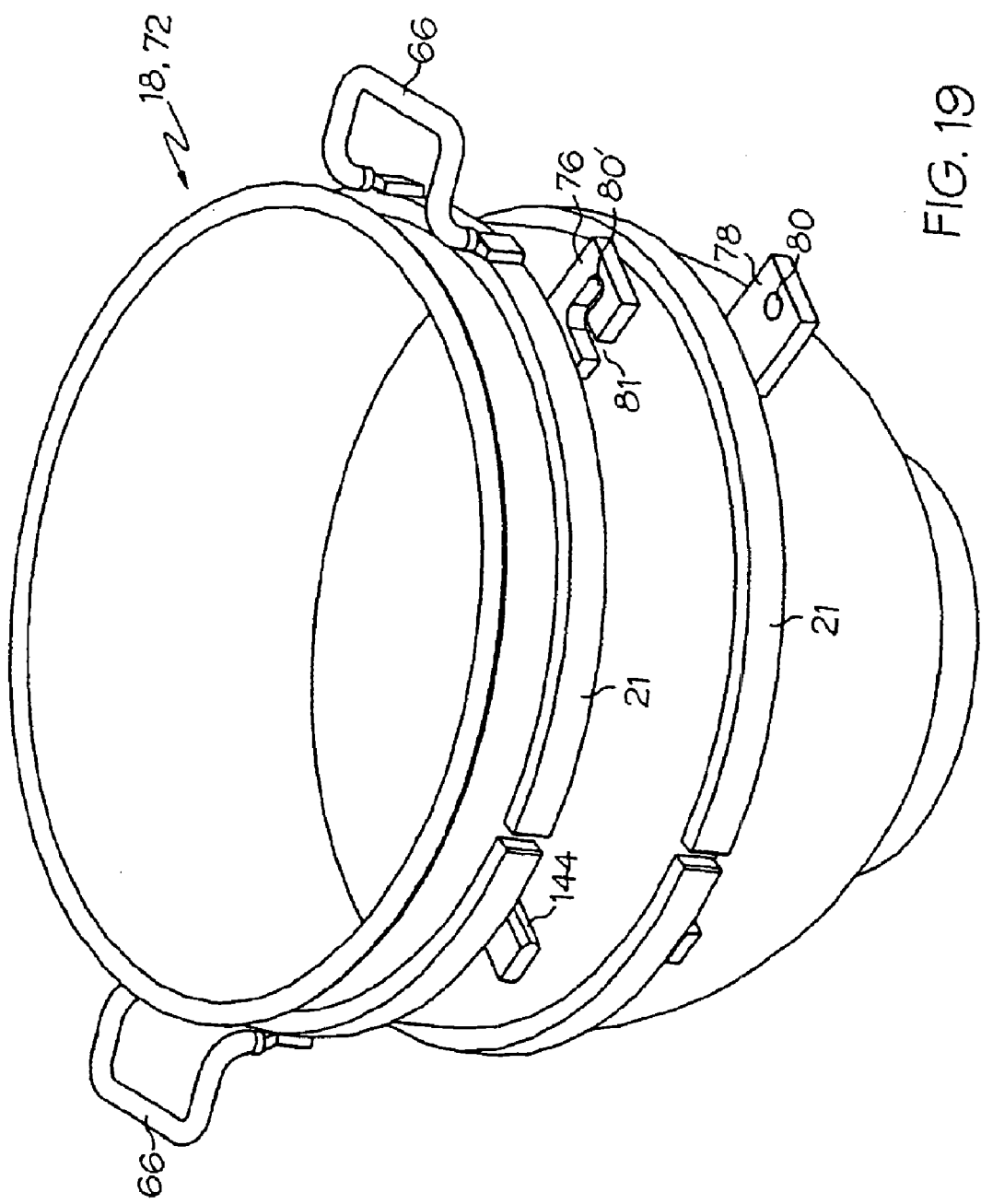
FIG. 19 is a perspective view of another embodiment of a bowl.

Any variety of pins and brackets may be used for mounting the bowl 18 to the mixer body 12. For example, the pins 24, 26, 82, 84 and associated holes or openings preferably have a generally circular, or nearly circular (i.e. hexagonal, elliptical, etc.), cross section, although pins and openings having other shapes may be used without departing from the scope of the invention. For example, as shown in FIGS. 18 and 19, at least one of the brackets 76, 78 may include only a partial opening 80' (i.e. an opening that is not fully enclosed). In FIG. 18, the opening 80' is generally semicircular in top view. In FIG. 19, the opening 80' is a nearly complete opening but includes a slot 81. Thus, it should be understood that the "openings" of the present invention need not necessarily include enclosed openings.

Although each of the brackets 32, 34 (or 76, 78) are illustrated as being attached to the bowl 18, 72, only one of the brackets 32, 34 (or one of the brackets 76, 78) need to be coupled to the bowl 18, 72. When only one of the brackets 32, 34 (or one of the bracket 76, 78) is coupled to the bowl, the other bracket may be coupled to the bracket that is coupled to the bowl. For example, with reference to FIG. 6, only the upper bracket 76 may be coupled to the bowl, and the lower bracket 78 may be coupled to a generally vertically-extending coupling member (not shown) that is located outside of the yoke 20 and coupled to the upper bracket 76. In this manner, the upper bracket 76, lower bracket 78, and coupling member may form a generally "C" shape in side view.

Furthermore, the bowl 18, 72 may be a two-piece bowl. For example, the bowl may include a first part which is an annular collar that includes the associated brackets 32, 34, 76, 78 located thereon. The first part of the bowl may be a collar similar to one of the rings 21, but the collar may be thick enough to support at least two of the vertically-spaced brackets 32, 34, 76, 78. In this case, collar can be pivotally coupled to the yoke, 20, and the second part of the bowl 18, 72 may be a bowl body that has a smooth outer surface that can slip into, or be lifted out of, the collar.

The mixer 10 may include a detent mechanism or locking mechanism to maintain the bowl 18, 72 in its closed position while the bowl 18, 72 is raised and lowered, or during mixing operations. For example, FIG. 3 illustrates one detent mechanism, generally designated 40, that may be used to maintain the bowl 18 in its closed position (the detent mechanism 40 may also of course be used with the bowl 72 or any other bowl used with a mixer). In this embodiment, the detent mechanism 40 is preferably located on an opposed side of the bowl 18 relative to the mounting structure 22, and at about the same height as the mounting structure 22 on the bowl 18. In the illustrated embodiment, the detent mechanism 40 includes a relatively soft, deformable washer 42 mounted on the yoke 20 and having a central opening 44 formed therein. The detent mechanism 40 also includes a forwardly extending peg 46 mounted on the bowl 18. The opening 44 in the washer 42 is slightly smaller than the largest portion of the peg 46, such that when the bowl 18 is moved to its closed position, the peg 46 is forced into the washer 42, which retains the peg 46 therein by an interference fit. In this manner, the detent mechanism 40 helps to maintain the bowl 18 in the closed position.

An alternate embodiment of the detent mechanism 40' is shown in FIG. 7. Again, although FIG. 7 illustrates the detent mechanism or guide 40' in conjunction with the bowl 18, the detent mechanism 40' may be used with the bowl 72 or any other bowl used with a mixer. In this embodiment, the peg 46 is mounted onto a washer 47, and the yoke 20 has a recess 49 shaped to receive the washer 47 therein. In this manner the bottom surface of the recess 49 may support some of the weight of the bowl 18 when the bowl 18 is in the closed position, and therefore the yoke 20 can help to support the weight of the bowl 18 when the washer 47 is received in the recess 49.

The portion of the detent mechanisms 40, 40' located on the bowl 18 can be located on nearly any surface of the bowl 18 that can engage a corresponding part located on the mixer body 12. Preferably, the portion of the detent mechanisms 40, 40' located on the bowl 18 are located on a portion of the bowl 18 that is located adjacent the yoke 20 when the bowl 18 is in the closed position. Furthermore, the orientation of various components of the detent mechanisms 40, 40' can be reversed. For example, the peg 46 of the detent mechanism 40 may be located on the mixer body 12 and the washer 42 may be located on the bowl 18. Similarly, the locking bracket 60 may be located on the bowl 18 and the locking pin 62 may be located on the mixer body 12.

FIGS. 9–12 illustrate yet another detent mechanism 104 that may be used with the mixer of the present invention. FIGS. 9–12 illustrate the detent mechanism 104 used with a bowl 102, although the detent mechanism 104 can be used with the bowls 18, 72 shown and described earlier, or nearly any other bowl used with a mixer. The bowl 102 of FIGS. 9–12 is similar to the bowl 72 of FIG. 6 in that the bowl 102 has brackets 76, 78 (not shown in FIGS. 9–12) with openings 80 therein, and the yoke 20 has upwardly-extending pins 82, 84 (not shown in FIGS. 9–12) similar to the yoke 20 shown in FIG. 6. The detent mechanism 104 includes a locking bracket 106 coupled to an outer surface 108 of the bowl 102, the locking bracket 106 including a generally circular opening 109 therein. The yoke 20 may have a generally hemispherically-shaped stainless steel pad 120 located thereon. The detent mechanism 104 includes a pivotable lock handle 110, which includes a gripping portion 107.

Figure 9:
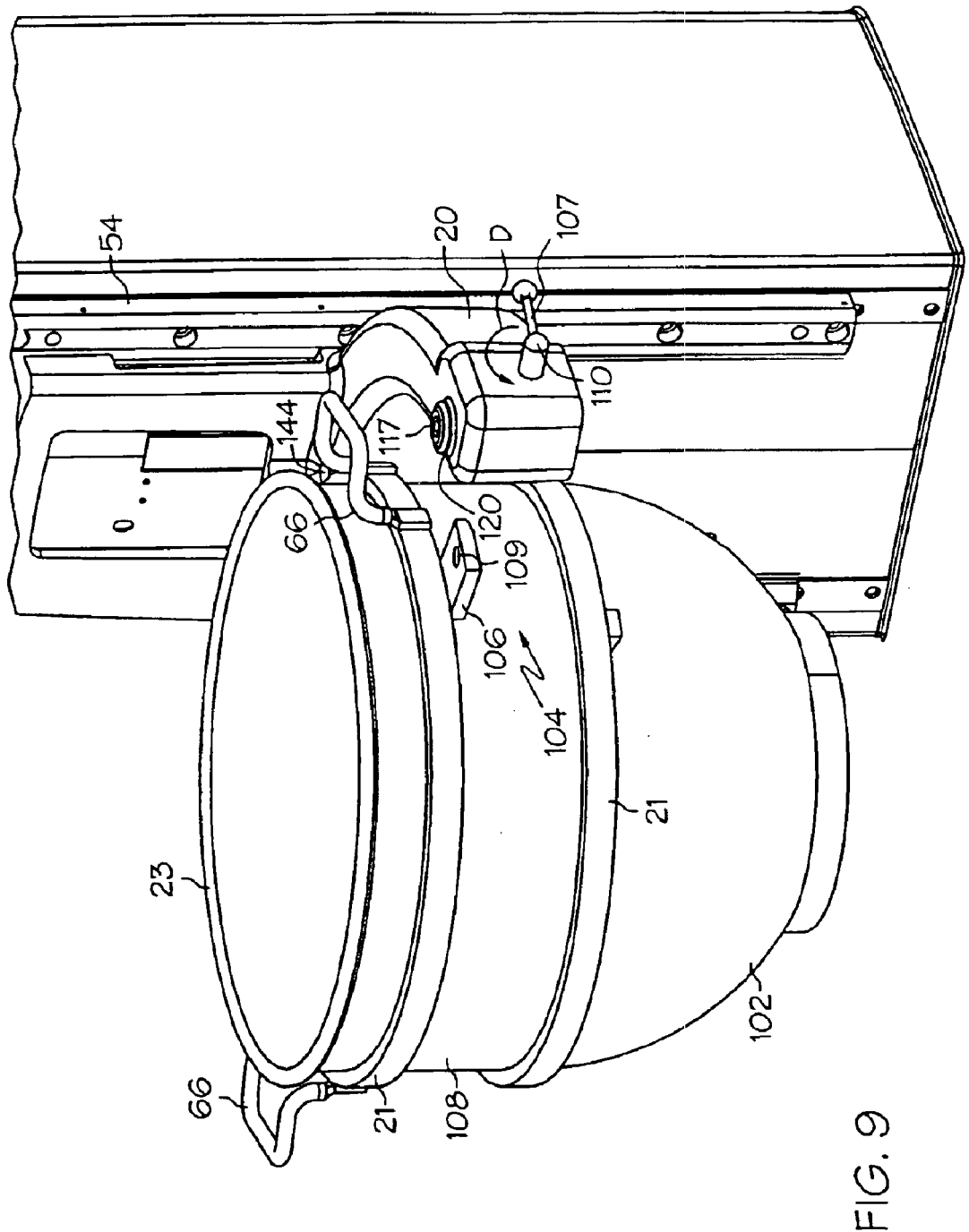
FIG. 9 is a perspective view of a bowl, yoke, and part of a mixer body, illustrating another detent mechanism, with the bowl in the loading position.

As shown in FIG. 12, the lock handle 110 is rotationally coupled to a cam 112 via a pin (not shown) passed through aligned openings 111 formed in both the handle 110 and cam 112. The cam 112 is in turn rotationally coupled to a locking pin 114 via a drive pin 113. The locking pin 114 is generally vertically oriented, and includes a generally hemispherical tip 117 received in the pad 120. The lock handle 110, cam 112 and locking pin 114 are rotationally coupled together such that the lock handle 110 can be pivoted to cause the locking pin 114 to be moved vertically. For example, FIG. 9 illustrates the detent mechanism 104 in its unlocked position wherein the locking pin 114 is flush with, or recessed below, the pad 120. When the lock handle 110 is rotated in the direction of arrow D of FIG. 9, the cam 112 is rotated in the direction of arrow D and the locking pin 114 is moved vertically upwardly such that the locking pin 114 protrudes above the pad 120 (see FIGS. 10 and 10A wherein the lock handle 110 has been rotated about 270°). Conversely, the lock handle 110 can be rotated in the direction of arrow E of FIGS. 10 and 10A to move the locking pin 114 vertically downwardly such that the locking pin 114 is flush with or recessed below the pad 120.

Figure 10:
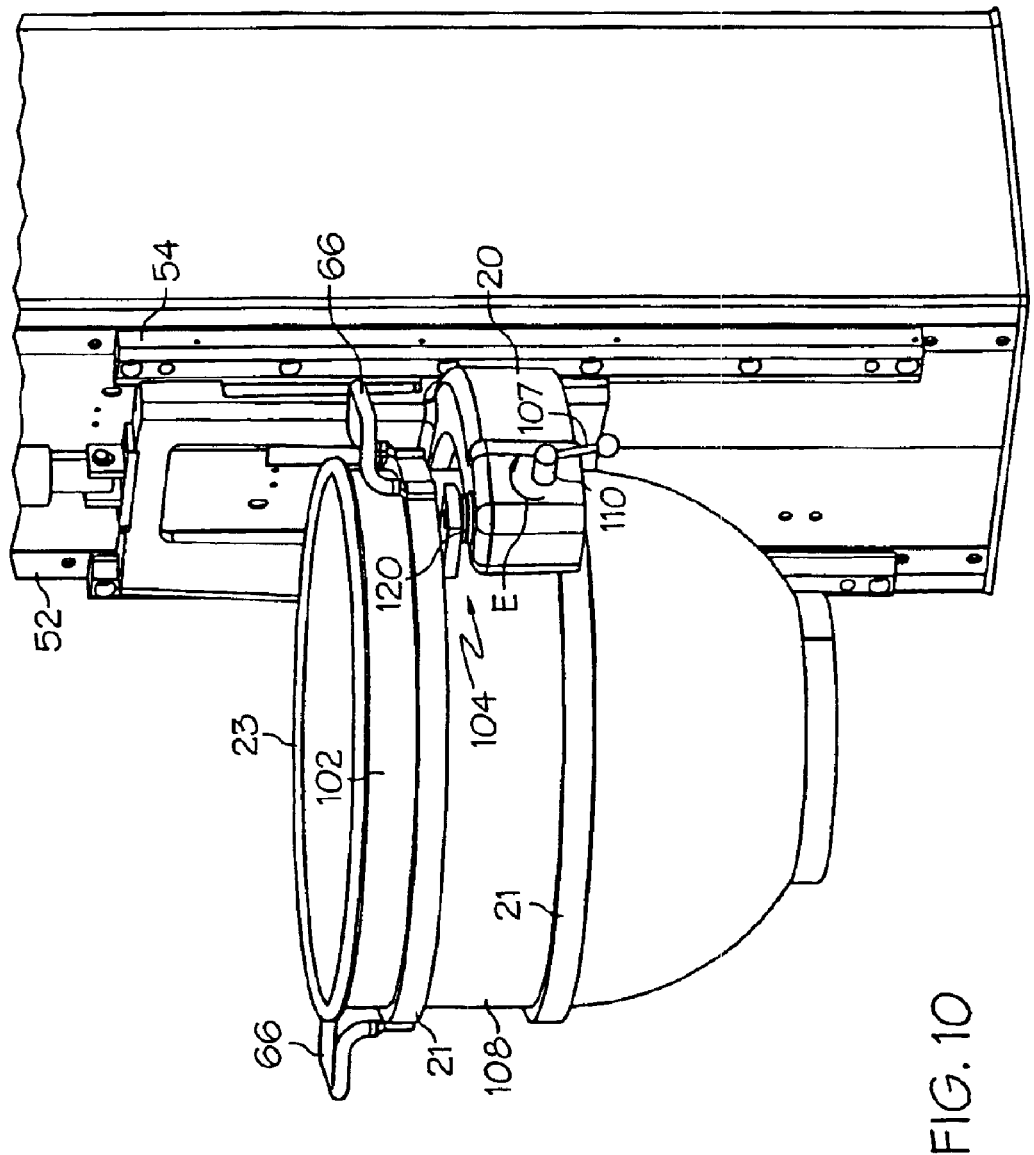
FIG. 10 is a perspective view of the bowl, yoke, and part of the mixer body of FIG. 9, with the bowl in its closed position.

In this manner, when the bowl 102 is in its closed position as shown in FIG. 10, the lock handle 110 can be rotated such that the tip 117 of the locking pin 114 protrudes above the pad 120 and is received in the opening 109 of the locking bracket 106 to maintain the bowl 102 in its closed position. When it is desired to release the detent mechanism 104 and move the bowl 102 out of the closed position, the handle 110 is rotated in the direction of arrow E to retract the locking pin 114. In this manner, the locking pin 114 effectively operates as a retractable mounting pin. The locking pin 114 could also be maintained in the extended position by friction, an over-center mechanism, or another detent or other similar means. Of course, a wide variety of other detent mechanisms may be used to maintain the bowls 18, 72, 102 in the closed position without departing from the scope of the invention, including a variety of latches, hooks, interengaging geometries, clasps, clips, frictionally engaging surfaces, magnets and the like. For example, the bowl may include an outwardly-extending protrusion, and the yoke may include a recess that is shaped to receive the protrusion therein. In this manner, in order to move the bowl into its closed position, the bowl may be lifted slightly upwardly and pivoted into the closed position such that the protrusion is located over the recess. The bowl can then be lowered such that the protrusion is received in the recess to maintain the bowl in the closed position.

Figure 10A:
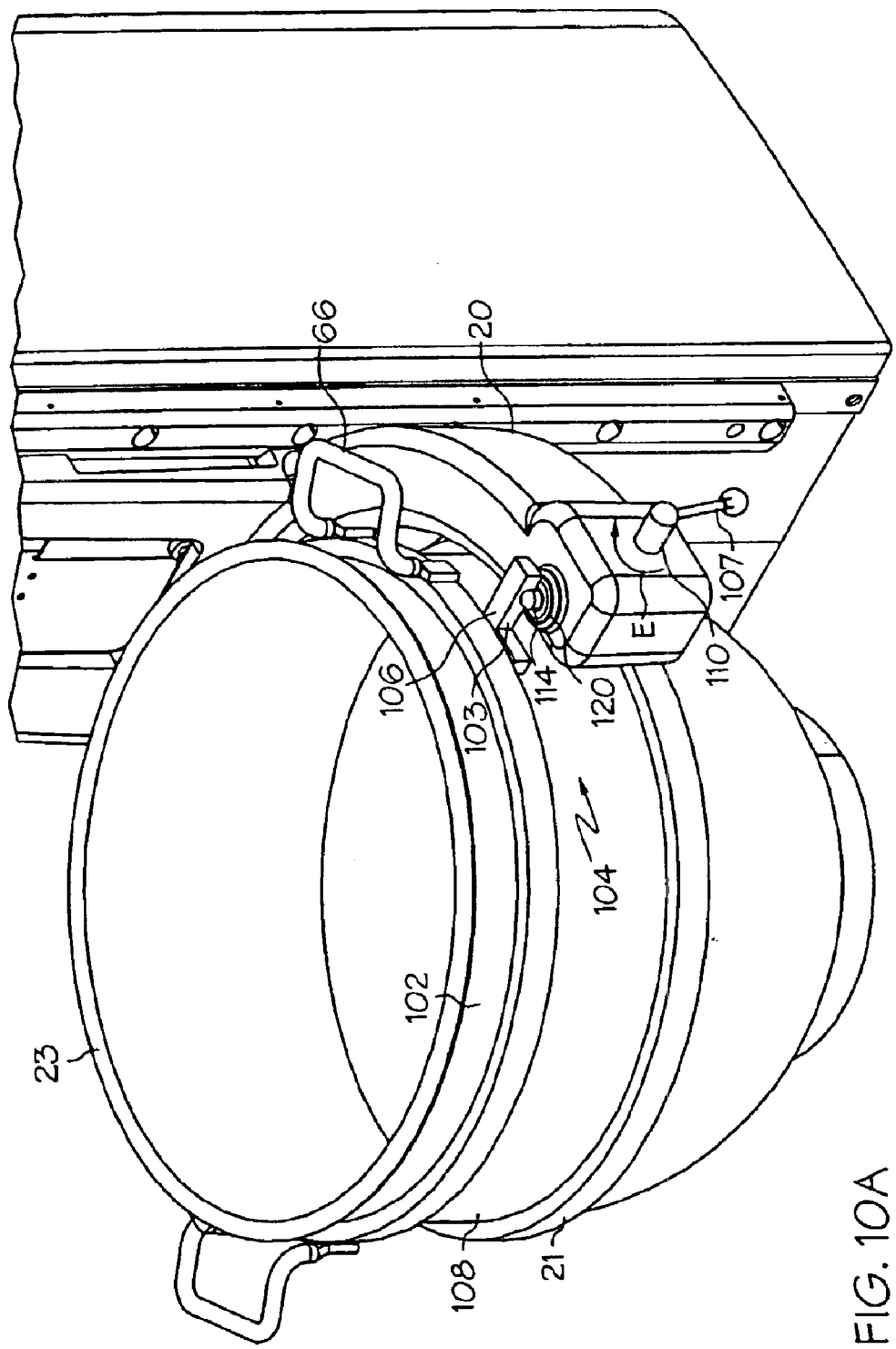
FIG. 10A is a perspective view of the bowl, yoke, and part of the mixer body of FIG. 10 illustrating an alternate bracket.

Although the bracket 106 preferably includes an opening 109 located therein such that the bowl 102 is blocked from pivoting in both directions, the bracket 106 need not include an opening 109 located therein as shown in FIG. 10A. In this case, the bracket 106 is located behind the locking pin 114, and the bracket 106 has an engagement surface 103 which engages the locking pin 114 and prevents the bowl 102 from pivoting away from the closed position. Thus, the bowl 102 can include nearly any protrusion, bracket, pin, or the like that can be located behind the locking pin 114 when the locking pin 114 is in its extended position. Furthermore, instead of including a hole or opening, the bracket 106 may include an indentation that receives the pin therein. The bracket 106 may also include a partial opening similar to the openings 80' shown in FIGS. 18 and 19.

Figure 20:
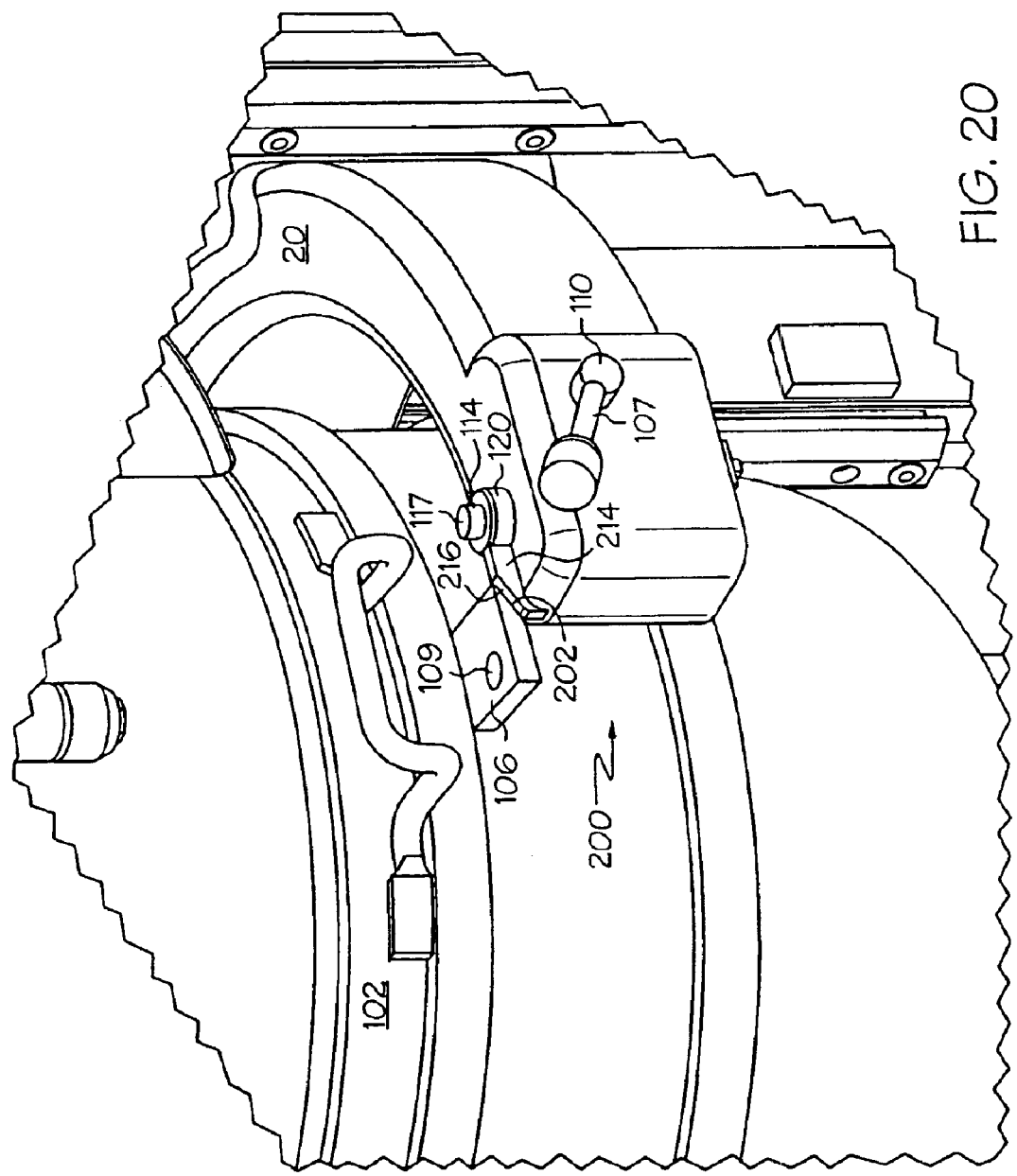
FIG. 20 is a detail perspective view of an alternate locking mechanism with the bowl spaced slightly away from its closed position.
Figure 21:
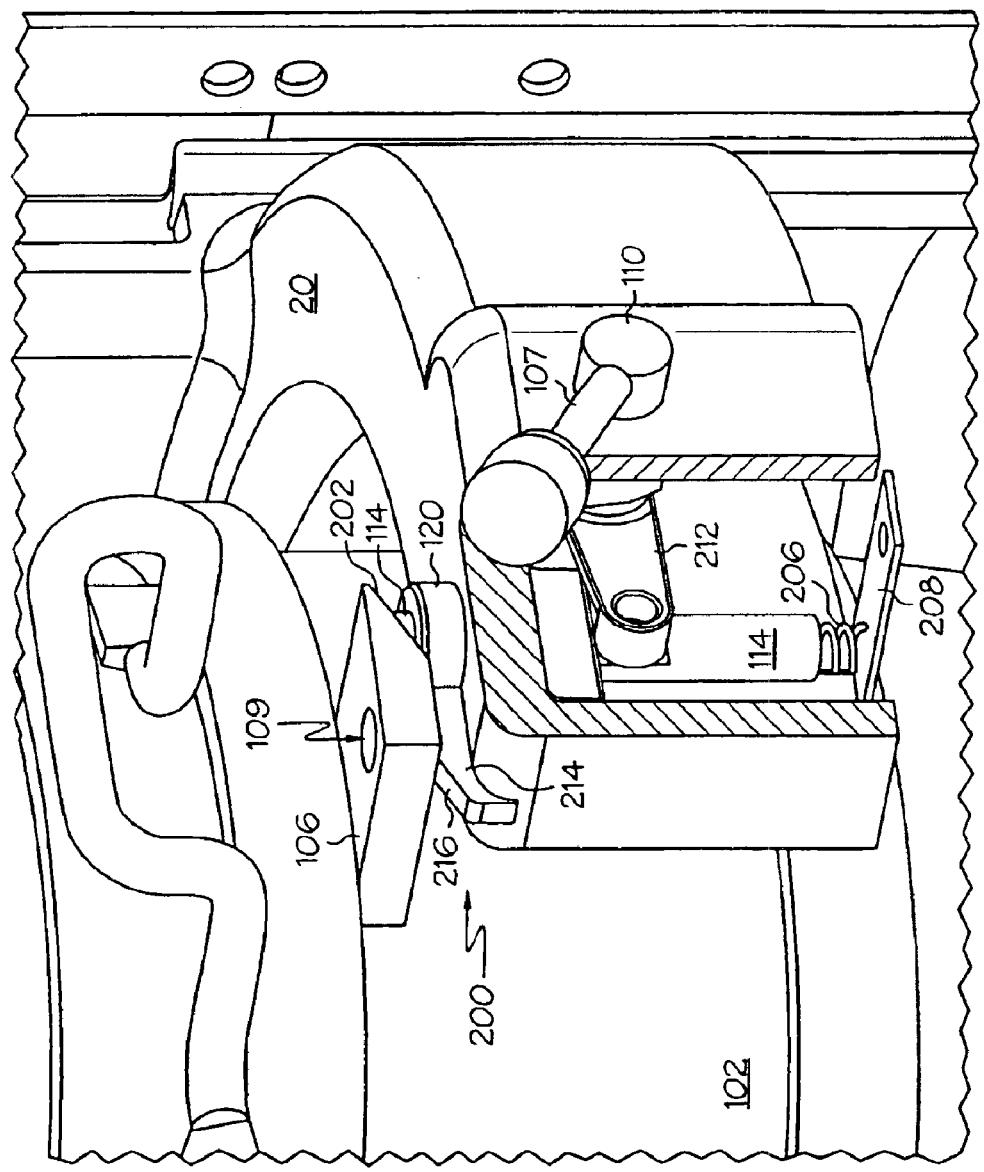
FIG. 21 is a perspective view of the locking mechanism of FIG. 20, with the bowl moved closer to the closed position.
Figure 22:
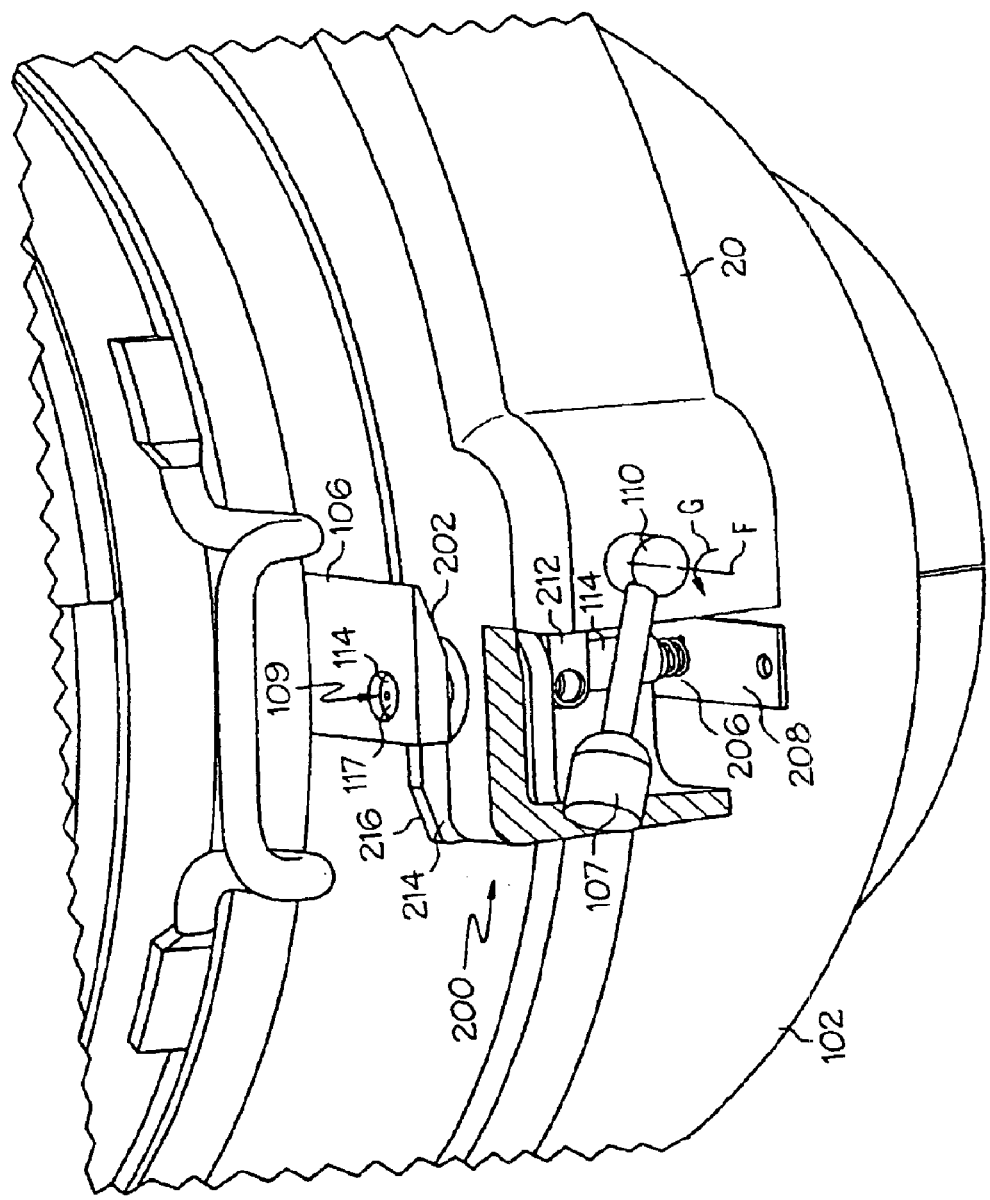
FIG. 22 is a perspective view of the locking mechanism of FIG. 20, with the bowl in its closed position.

FIGS. 20–22 illustrate an alternate detent mechanism or locking mechanism, generally designated 200. In this embodiment, the locking bracket 106 may have a leading edge surface 202 which faces the mixer body 12 when the bowl 102 is located in or adjacent to the closed position. As best shown in FIGS. 21 and 22, the leading edge surface 202 may be angled or tapered such that the leading edge surface 202 faces generally downwardly.

The locking pin 114 may be spring biased generally upwardly such that, in the absence of outside forces, the tip 117 of the locking pin 114 protrudes upwardly beyond the pad 120. As shown in FIGS. 21–22, the locking mechanism 200 may include a spring 206 located between a spring plate 208 and the locking pin 114 to spring bias the locking pin 114 generally upwardly. As in the previously described embodiment, the locking mechanism 200 may also include a locking actuator or lock handle 110 having a gripping position 107 which can be operated to retract the locking pin 114. The gripping portion may be coupled to a connecting arm 212, which is in turn coupled to the locking pin 114. The yoke 20 may include a guide 214 located adjacent to the pad 120 and having a guide surface 216 which is tapered or angled to correspond to the leading edge surface 202.

In operation, the mixer bowl 102 is first pivotally coupled to the mixer body 12 by a hinge, for example, as shown and described above. As the mixer bowl 102 is pivoted toward its closed position (FIG. 20), the weight of the bowl 102 and the cantilever nature of the pivotable attachment may cause the locking bracket 106 to be located slightly below the pad 120. Thus, as the mixer bowl 102 is pivoted into the closed position, the leading edge surface 202 of the locking bracket 106 may slidably engage the guide surface 216 of the guide 214 to raise the bowl 102 and locking bracket into the desired position (FIG. 21).

As shown in FIG. 21, as the bowl 12 is continued to be rotated toward its closed position, the leading edge surface 202 of the locking bracket 106 engages the tip 117 of the locking pin 114 and urges the locking pin 114 downwardly, thereby compressing the spring 206. The hemispherical tip 117 of the pin may interact with the tapered surface 202 to ensure that the locking pin 114 is urged downwardly. However, it should be understood that the locking pin 114 and the leading edge surface 202 may have any of a wide variety shapes or geometries that enable the locking pin 114 to be moved to a retracted position when the locking bracket 106 engages the locking pin 114 or when the bowl 102 is pivoted into the closed position.

Once the mixer bowl 102 is fully pivoted into the closed position, the locking pin 114 moves upwardly into and/or through the opening 109 of the locking bracket 114, as urged by the spring 206, to retain the locking bracket 106 and bowl 102 in the closed position. Thus, the cooperating geometries of the locking pin 114 and locking bracket 106 enable the bowl 102 to be pivoted into the closed position and retained therein without any actuation of the locking mechanism 200 or any other action by an operator.

When it is desired to pivot the bowl 102 away from the closed position, the operator can grip the gripping portion 107 and pivot the gripping portion 107 about the axis F in the direction of arrow G, as shown in FIG. 22. The pivoting motion of the gripping portion 107 in the direction of arrow G causes downward motion of the connecting arm 212 and locking pin 114, thereby compressing the spring 206 between the plate 208 and the locking pin 114. Once the locking pin 114 is sufficiently retracted, the locking bracket 106 and bowl 102 can be pivoted away from the closed position and, for example, into the loading/unloading position. The locking pin 114 need not necessarily be fully retracted such that the locking pin 114 is entirely located below the top surface of the pad 120, but need only be retracted sufficiently to allow the locking bracket 106 to pass over the locking pin 114. Thus, the locking mechanism 200 of this embodiment enables the bowl 102 to be quickly and easily pivoted into the closed position, but requires actuation or positive action to release the bowl 102 such that the bowl can be pivoted away from the closed position.

As in the previous embodiment, instead of having an opening 104 located therein, the locking bracket 106 may include an indentation, or simply be shaped to be located behind the locking pin 114 as shown in FIG. 10A. The bowl 102 of FIGS. 20–22 may include any or all of the components described above, including but not limited to the hinge mounting structure 22 and all variants thereof. Furthermore, the locking mechanism 200 of FIGS. 20–22 may be used on nearly any mixer bowl, including but not limited to the mixer bowls 18, 72, 102 described above. Additionally, if desired, the location on the locking pin 114 may be reversed such that the locking pin is located on the bowl 102, and interacts with an opening, recess, or other feature located on the mixer body to selectively prevent rotation of the bowl.

Figure 23:
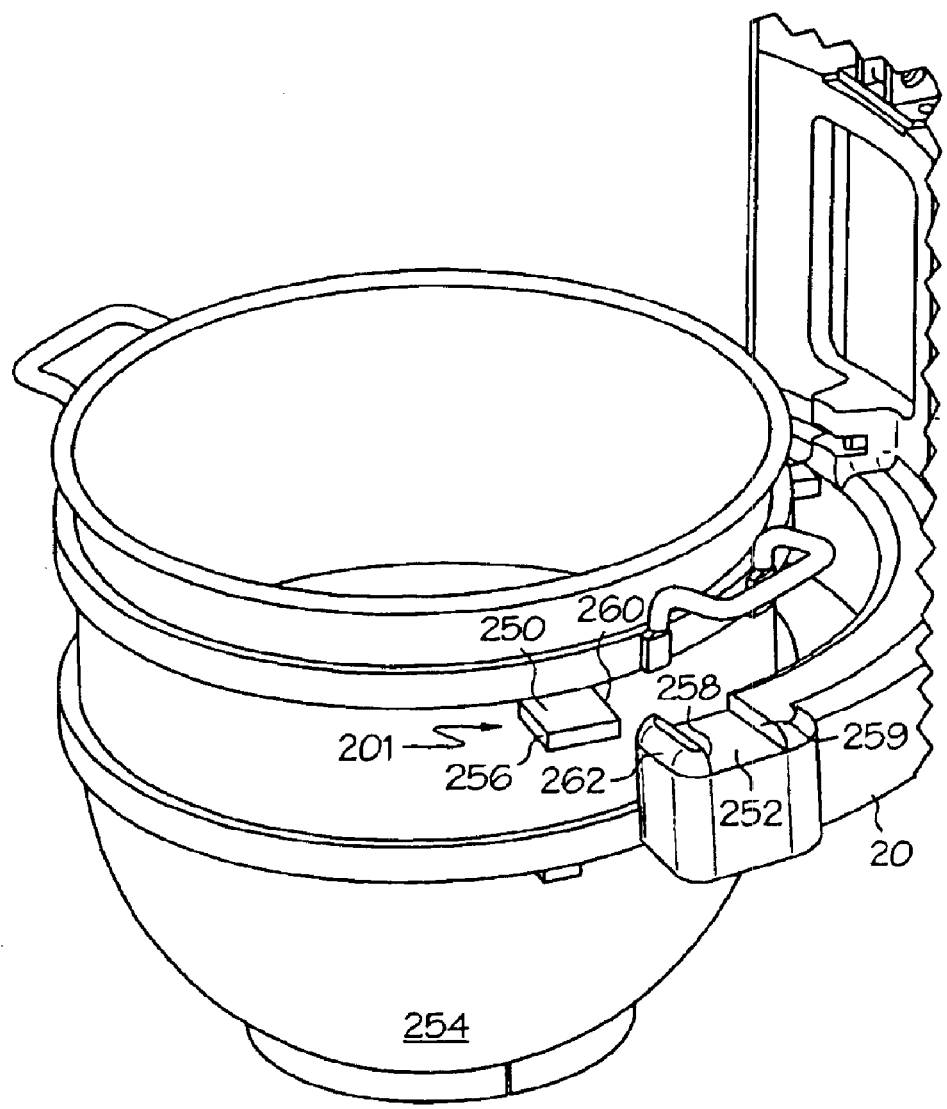
FIG. 23 is a perspective view of a bowl and part of a mixer body, illustrating an alternate locking mechanism.

FIG. 23 illustrates a system with an alternate detent or locking mechanism, generally designated 201. In this case, the bracket 250 need not necessarily include an opening. The yoke 20 may include a recess, such as a generally rectangular recess 252, formed therein. In this manner, when the bowl 254 of FIG. 23 is pivoted into its closed position, the bracket 250 may be received in the recess 252. The generally vertically extending faces of the bracket 250 may defines a pair of protrusion 256, 260 and the recess 252 may define a pair of generally vertically extending faces or protrusions 258, 259. In this manner, the vertical faces or protrusions 256, 258 may interact or abut to prevent undesired rotation of the bowl 254 out of the closed position or to the loading/unloading position. The faces or protrusions 259, 260 may interact or abut to prevent over-rotation of the bowl 254.

When it is desired to pivot the bowl 254 out of the closed position, the bowl 254 may be lifted such that the bracket 250 is lifted out of the recess 252 and the protrusions 256, 258 are vertically spaced. The bowl 254 can then pivoted out of the closed position and toward the loading/unloading position until the bracket 250 is pivoted clear of the yoke 20. The bowl 254 can then be lowered until the weight of the bowl 254 is fully carried by the hinge mechanism, and the bowl 254 can be pivoted in the desired manner.

If desired, the leading edge 260 of the bracket 250 can be angled to enable the bracket 250 to slide over the end of the yoke 20 and into the recess 252. Alternately, or in addition, the yoke 20 or mixer body may include a surface, such as the angled guide surface 216 shown in FIGS. 20–22, or curved surface 262 shown in FIG. 23, to slightly raise the bowl 254 and enable the bracket 250 to be received in the recess 252 as the bowl 254 is pivoted into the closed position.

If desired, the location of the recess 252 can be switched such that the recess is located on the bowl. In this case, the recess would be located on the bottom surface of the bracket 250 or other similar structure, and the yoke would include a radially inwardly-extending protrusion that could be received in the recess. Again, the bracket and/or protrusion may include geometries to allow the bowl to smoothly slide into the closed position.

Figure 13:
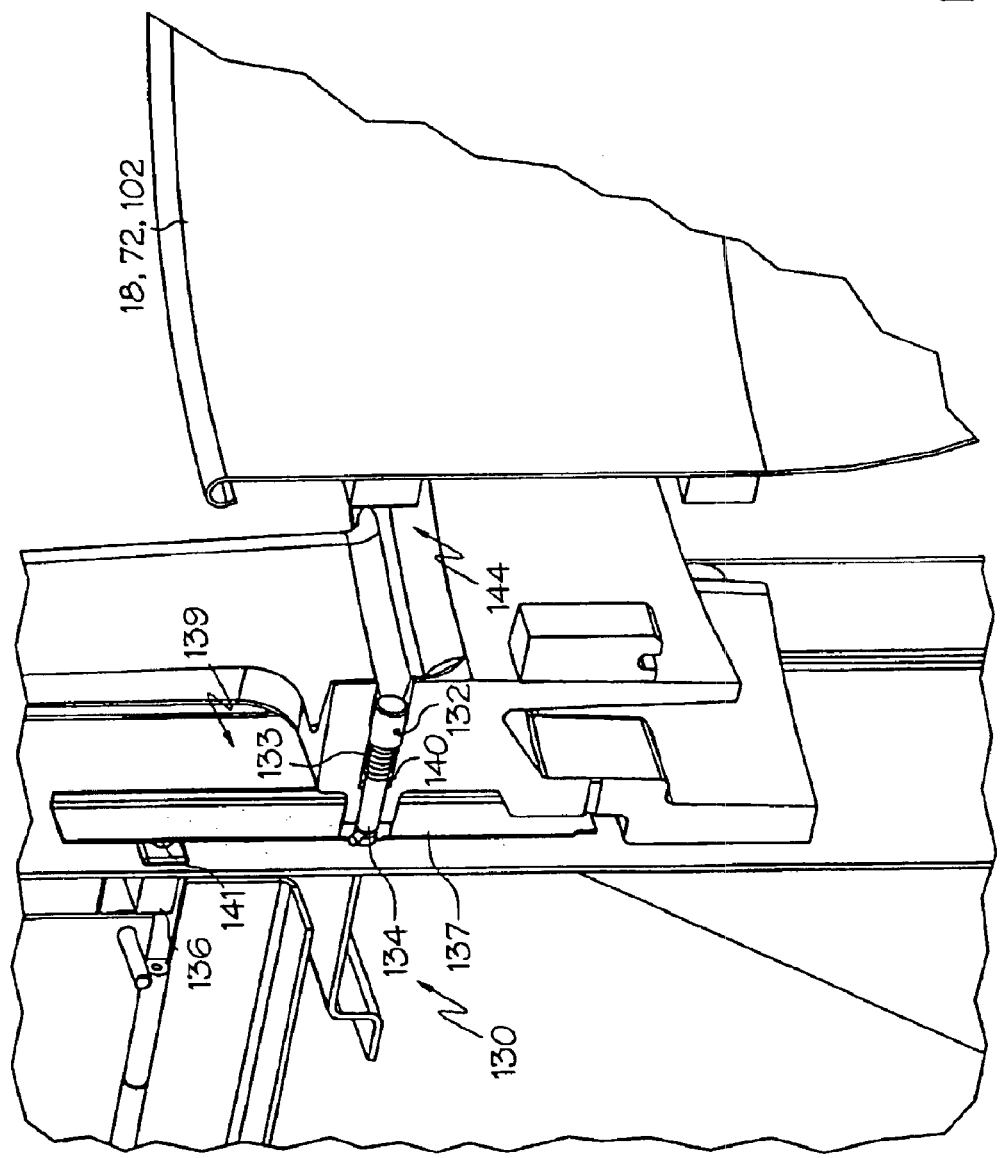
FIG. 13 is a perspective partial cross section of the mixer of FIG. 9, illustrating the bowl switch in its open position.
Figure 14:
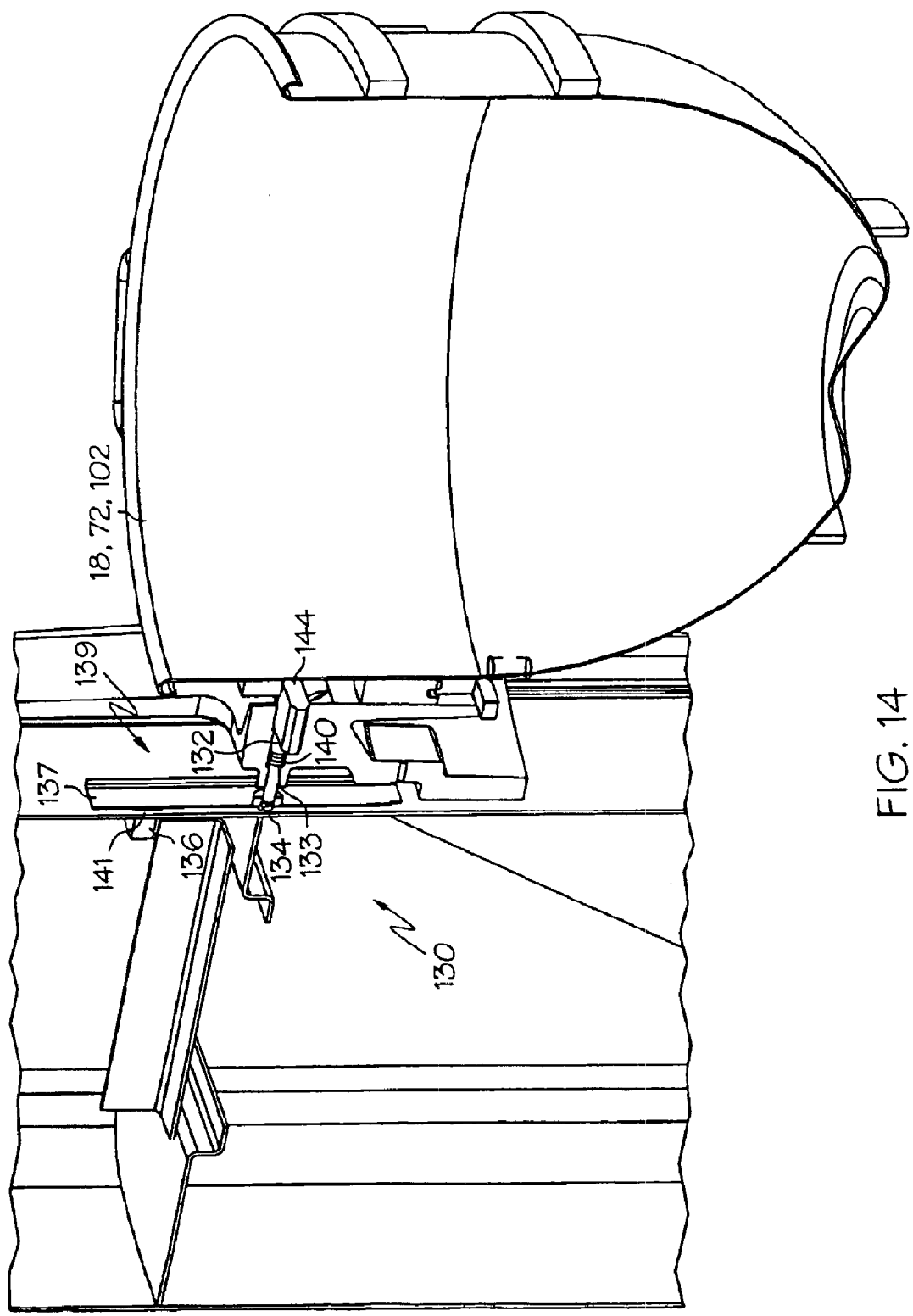
FIG. 14 is a perspective partial cross section of the mixer of FIG. 9, illustrating the bowl switch in its closed position.
Figure 15:
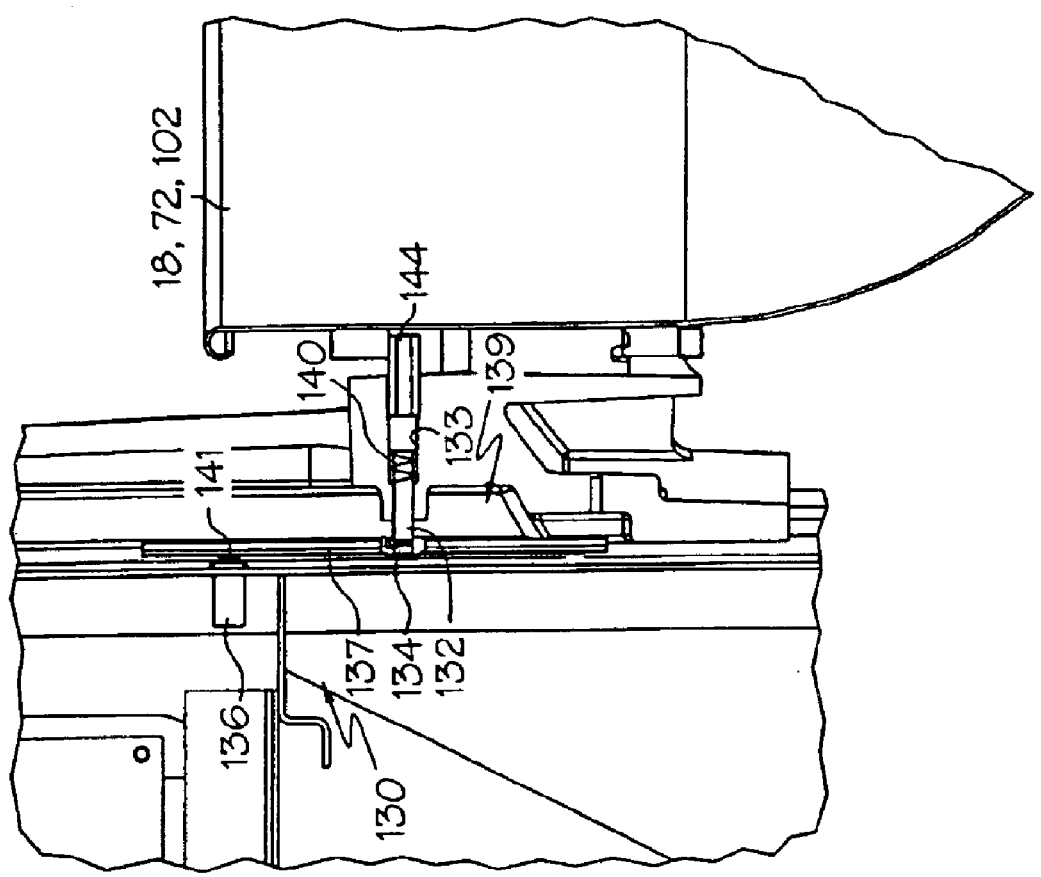
FIG. 15 is a side cross section of the bowl of FIG. 9, illustrating the bowl switch in its closed position.

As illustrated in FIGS. 13–15, the mixer of the present invention may also include a sensor, generally designated 130, to detect when the bowl 18, 72, 102 is in its closed position. In the illustrated embodiment, the sensor 130 includes a spring loaded plunger 132 that is received in a slot 133 of the mixer body 12. The inner end 134 of the plunger 132 is coupled to a generally vertically-extending switch plate 137. The plunger 132 and switch plate 137 together form an actuating assembly 139. The sensor 130 also includes a limit switch 136 having a trigger 141 coupled to the mixer body 12. The sensor 130 includes a spring 140 located about the plunger 132 to bias the plunger 132 away from the mixer body 12 and toward the bowl 18, 72, 102. In this manner, in the absence of outside forces the switch plate 137 is spaced away from the trigger 141.

The bowl 18, 72, 102 may include a lug or protrusion 144 located on an outer surface of the bowl and extending generally outwardly therefrom. As shown in FIGS. 14 and 15, the protrusion 144 is shaped to engage the plunger 132 and move the plunger 132 inwardly (thereby compressing the spring 140) when the bowl 18, 72, 102 is located in the closed position. When the protrusion 144 engages the plunger 132 and moves the plunger 132 inwardly, the switch plate 137 is pressed into contact with the trigger 141 of the limit switch 136, thereby triggering the limit switch 136. The limit switch 136 can then send a signal to a central controller, processor or CPU of the mixer to indicate that the bowl 18, 72, 102 is in the closed position. In one embodiment, the bowl 18, 72, 102 and/or plunger 132 may include a disengagement feature such that the protrusion 144 engages and pulls the plunger 132 outwardly when the bowl 18, 72, 102 is pivoted away from its closed position. The disengagement feature may includes various inter engaging geometries, rotating cams and the like.

Once the bowl 18, 72, 102 is in its closed position and the limit switch 136 is triggered, the bowl may be raised into the operating position and the contents of the bowl may be mixed by the mixing element 16. The switch plate 137 is coupled to the yoke 20 and therefore moves vertically with the yoke 20 and bowl 18, 72, 102 as the yoke 20 is moved. Thus, the switch plate 137 may be a relatively long, vertically extending strip that slides over the trigger 141 as the yoke 20 is raised so that the switch plate 137 can thereby maintain the limit switch 136 in its closed or triggered state. Thus, the switch plate 137 may be long enough such that at least part of the switch plate 137 is located over the trigger 141 for the entire vertical range of motion of the yoke 20.

If desired, the spring 140 may be sufficiently stiff such that the bowl 18, 72, 102 cannot remain in the closed position without activating the detent mechanism 104. In other words, the spring 140 may cause the bowl 102 to pivot out of the closed position unless the detent mechanism 104 is activated to lock the bowl 18, 72, 102 in the closed position. In this manner, the ejection of the bowl 18, 72, 102 out of the closed position by the spring 140 can serve as a reminder to the operator to activate the detent mechanism 104. Of course, the mixer may have another spring or other structure besides the spring 140 to eject the bowl out of the closed position.

Figure 16:
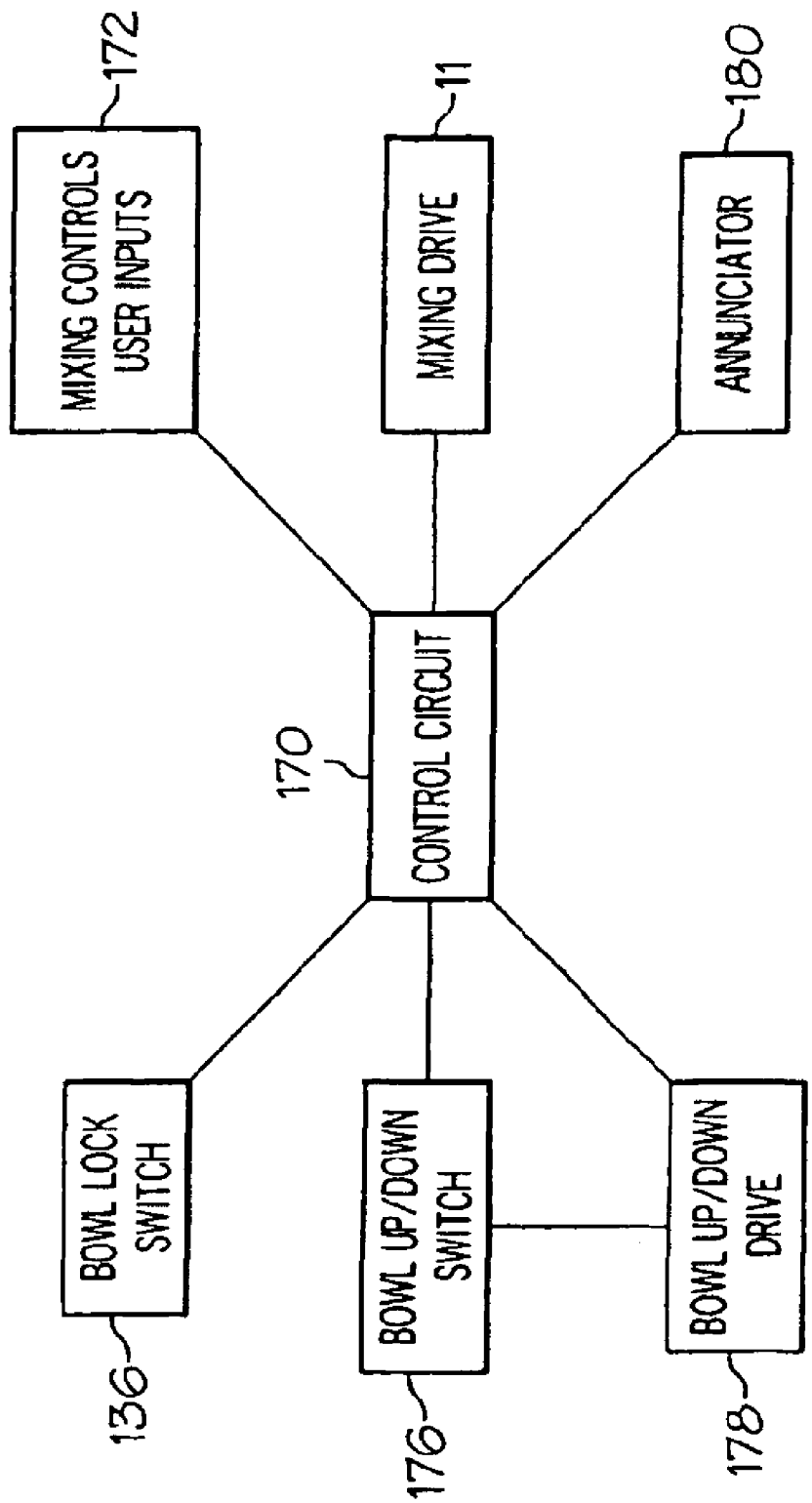
FIG. 16 is a block diagram illustrating one embodiment of a control structure architecture that may be used to control a mixer.

FIG. 16 illustrates a block diagram of a control structure that may be used in association with the sensor 130 to control mixer operations. The limit switch or lock switch 136 may be coupled to a control circuit 170. The control circuit 170 may be coupled to a user input panel 172, which can be operated by a user to input the desired rotational speed of the mixing element 16, the duration of mixing, etc. The control circuit 170 may also be coupled to the mixing drive 11 to control the rotation of the output component 15 and mixing element 16. The mixer may also include a bowl up/down switch 176 that can be actuated by an operator to trigger a bowl up/down drive 178 to raise and/or lower the yoke and bowl. The bowl up/down switch 176 may be coupled to the control circuit 170 and to the bowl up/down drive 178 which drives the vertical movement of the bowl and yoke. The bowl up/down drive 178 may also be coupled to the control circuit 170. The control circuit 170 may also be connected to an annunciator 180, such as a buzzer, that can be activated upon the occurrence of certain events.

The control structure of FIG. 16 may be used to ensure that the switch 136 must be closed before the bowl up/down drive 178 and the mixing drive 11 are activated. More particularly, if the switch 136 is not closed, the control circuit 170 may disable the mixing drive 11, bowl up/down drive 178 and/or the bowl up/down switch 176. Alternately, if the switch 136 is not closed, the up/down drive 178 may be controlled such that the bowl can be lowered but cannot be raised. Similarly, if the switch 136 becomes opened during lifting or mixing operations, the control circuit 170 may disable the mixing drive 11, bowl up/down drive 178 and/or the bowl up/down switch 176 to stop any lifting or mixing operations. If the sensor 130 becomes opened during mixing operations, besides disabling the mixing drive 11, the control circuit may trigger the annunciator 180 to attract the attention of the operator.

Figure 17:
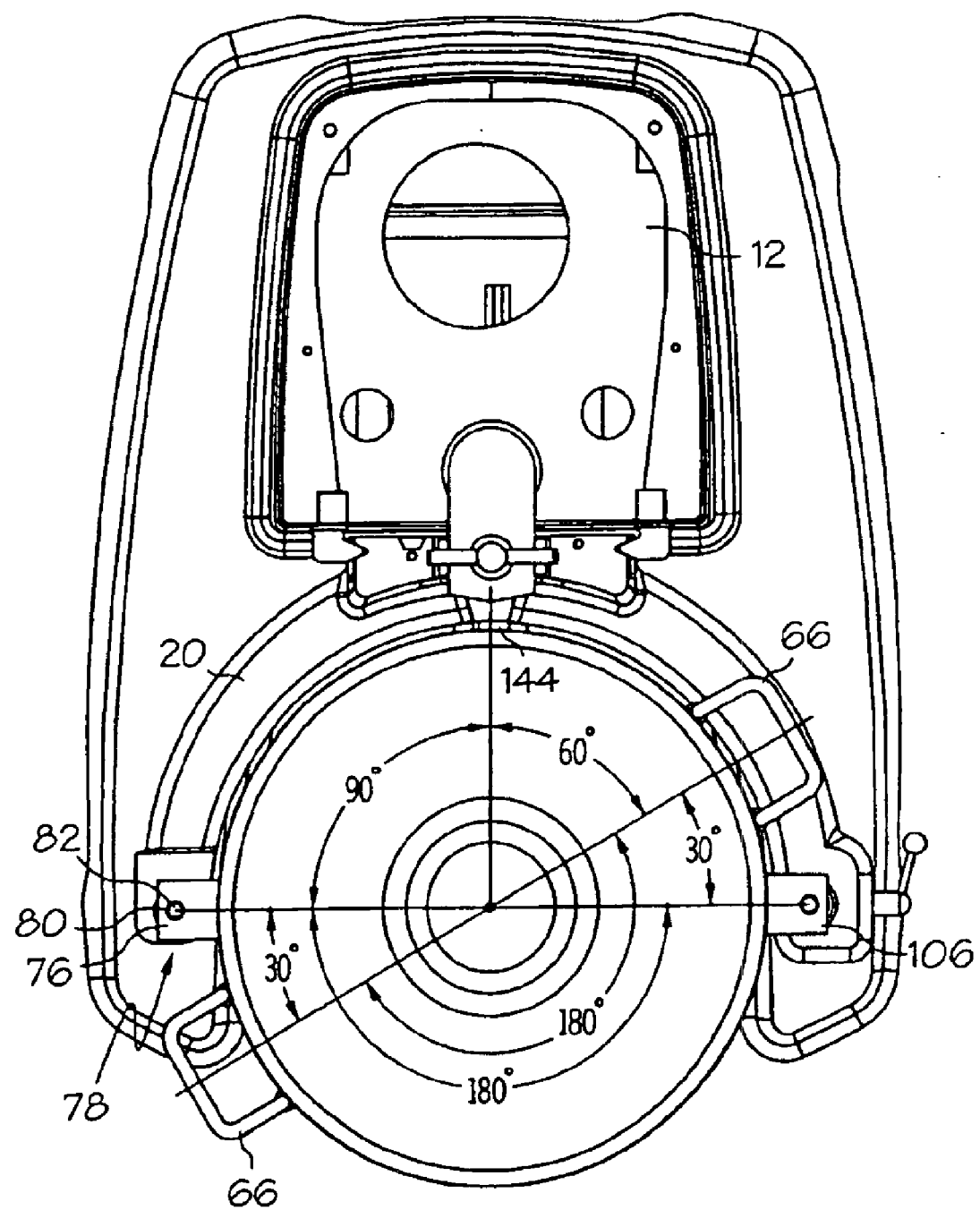
FIG. 17 is a top view of the mixer of FIG. 9.

The location and orientation of the various components of the bowl 102 may be varied to conform the bowl to various mixers. However, FIG. 17 illustrates one embodiment of the bowl 102. In the illustrated embodiment, the handles 66 are about 180 degrees apart from each other. Similarly, the locking bracket 106 and the mounting brackets 76, 78 are about 180 degrees apart from each other. The mounting brackets 76, 78 are spaced about 30 degrees from the adjacent handle 66, and the protrusion 144 is spaced about 90 degrees from the locking brackets 76, 78 and locking bracket 106.

Having described the invention in detail and by reference to the preferred embodiments, it will be apparent that modifications and variations thereof are possible without departing from the scope of the invention.

What is claimed is:

1. A mixer system comprising:
   a bowl for receiving a material to be mixed;
   a mixer body having a rotatable output component;
   a hinge, said bowl being pivotable about said hinge relative to said mixer body such that said bowl can be pivoted between a loading/unloading position and a closed position relative said mixer body; and
   a locking mechanism located at least partially on one of said bowl or said mixer body, said locking mechanism being normally biased into a locking position, wherein at least a portion of the other of said bowl or said mixer body interacts with said locking mechanism to move said locking mechanism toward a release position to allow the bowl to move to the closed position, the locking mechanism moving back toward the locking position when the bowl is in the closed position to retain the bowl in the closed position.

2. The mixer system of claim 1 wherein said locking mechanism includes a locking pin located on one of said bowl or mixer body and said portion includes a locking bracket located on the other of said bowl or mixer body that is shaped to interact with said locking pin to selectively prevent rotation of said bowl.

3. The mixer system of claim 2 further comprising a gripping portion which can be operated to move said locking pin closer to or further away from said bracket.

4. The mixer system of claim 2 wherein said locking pin is biased toward said bracket.

5. The mixer system of claim 4 wherein said locking pin is located on said mixer body and is shaped to be received in or located adjacent to said locking bracket to prevent said bowl from pivoting relative to said mixer body when said bowl is in said closed position and said locking mechanism is not actuated.

6. The mixer system of claim 4 wherein said locking pin extends generally vertically, and wherein said locking bracket includes an opening to receive said locking pin therein.

7. The mixer system of claim 6 wherein said locking pin is spring biased generally upwardly.

8. The mixer system of claim 2 wherein said locking mechanism includes an actuator that can be manually operated to move said locking mechanism to said release position.

9. The mixer system of claim 8 wherein said actuator includes a gripping portion coupled to said locking pin such that operation of said gripping portion causes said locking pin to move away from said locking bracket.

10. The mixer system of claim 2 wherein said bracket includes an leading edge surface that is shaped to engage said locking pin and urge said locking pin away from said bracket as said bowl is pivoted into said closed position.

11. The mixer system of claim 10 wherein said leading edge surface is an angled surface and wherein said locking pin includes a generally hemispherical tip that engages said leading edge surface as said bowl is pivoted into said closed position.

12. The mixer system of claim 1 wherein said output component is rotatable about a rotation axis, and wherein said hinge supports said bowl during said pivoting such that a central axis of said bowl is generally parallel to said rotation axis when said bowl is in said loading/unloading position.

13. The mixer system of claim 1 wherein said hinge is formed by a combination of a hinge portion of said bowl and a hinge portion of said mixer body.

14. The mixer system of claim 13 wherein said hinge portion of said bowl includes at least one bracket having at least one opening therein and said hinge portion of said mixer body includes at least one hinge pin received in said opening of said bracket.

15. The mixer system of claim 1 further including a switch that is triggered when said bowl is in said closed position.

16. A mixer system comprising:
   a bowl for receiving a material to be mixed, said bowl including an outer surface and a mounting bracket coupled to and extending from said outer surface, said mounting bracket having an opening formed therein, said bowl further including a locking bracket coupled to and extending from said outer surface on a generally opposite side of said bowl relative to said mounting bracket; and
   a mixer body having a motor for driving a mixing element and a yoke shaped to receive said bowl therein, said mixer body including a mounting pin shaped to be received in said opening of said mounting bracket to pivotally couple said bowl to said mixer body such that said bowl can be pivoted between a loading/unloading position and a closed position relative to said mixer body, said mixer body further including an at least partially retractable locking pin shaped to interact with said locking bracket to selectively prevent said bowl from pivoting relative to said mixer body, said locking bracket being shaped and arranged such that said locking bracket urges said locking pin into said at least partially retracted position to allow said bowl to pivot into said closed position and wherein said locking pin blocks said bowl from pivoting out of said closed position when said locking pin is not sufficiently retracted.

17. The mixer system of claim 16 further comprising an actuator coupled to said locking pin such that said actuator can be operated to at least partially retract said locking pin to enable said bowl to pivot out of said closed position.

18. The mixer system of claim 16 wherein said locking pin is biased upwardly.

19. The mixer system of claim 16 wherein said bracket includes an angled leading edge surface that is shaped to engage said locking pin and urge said locking pin away from said bracket as said bowl is pivoted into said closed position.

20. The mixer system of claim 16 wherein said bowl has a central bowl axis, and wherein said mounting pin and said locking pin each extend generally parallel to said bowl axis.

21. The mixer system of claim 16 further comprising an auxiliary mounting bracket coupled to and extending from an outer surface of said bowl and having an opening therein, said auxiliary mounting bracket being vertically spaced from said mounting bracket, said opening of said auxiliary mounting bracket being generally aligned with said opening of said mounting bracket to define a pivot axis of said mixer bowl.

22. A mixer bowl including a bowl body having an outer surface and an upper edge, a mounting bracket extending from said outer surface at a first side portion of said bowl, said mounting bracket having an opening formed therein, said bowl further including a locking bracket extending from said outer surface at a second side portion of said bowl, said second side portion is substantially diametrically opposite said first side portion, said bowl further including a switch actuator protrusion extending from said outer surface at a third side portion of said bowl, said third side portion is spaced circumferentially from said locking bracket by about ninety degrees and is spaced circumferentially from said mounting bracket by about ninety degrees, said locking bracket having a lower support surface that faces downwardly and a ramp surface that faces downwardly at an angle relative to said lower support surface, said ramp surface extends upward from said lower support surface at a side edge thereof that faces in a direction toward said third portion of said bowl.

23. The mixer bowl of claim 22 wherein said locking bracket has an opening formed therein.

24. The mixer bowl of claim 23 wherein said opening of said mounting bracket and said opening of said locking bracket both extend generally vertically.

25. The mixer bowl of claim 22 wherein said locking bracket is located at about the same height on said bowl as said mounting bracket.

26. The mixer of claim 22 further including an auxiliary mounting bracket at a location below said mounting bracket and having an opening that aligns with said opening of said mounting bracket to define an upright pivot axis of said bowl.

27. The mixer bowl of claim 26 wherein at least one of said opening of said mounting bracket and said opening of said auxiliary mounting bracket is less than full enclosed.

28. The mixer bowl of claim 26 wherein at least one of said opening of said mounting bracket and said opening of said auxiliary mounting bracket is configured as a slot.

29. A mixer bowl including a bowl body having an upper edge and an outer surface, a mounting bracket extending from said outer surface, said mounting bracket having an opening formed therein, a locking bracket extending from said outer surface on a generally opposite side of said bowl relative to said mounting bracket, said locking bracket having a downward facing support surface and a ramp surface that faces downwardly at an angle relative to said support surface, said mixer bowl further including an auxiliary mounting bracket having an opening therein, said opening of said auxiliary mounting bracket being vertically spaced from and generally aligned with said opening of said mounting bracket to define a pivot axis of said mixer bowl, wherein said mounting bracket and said auxiliary mounting bracket are at fixed, stationary positions relative to said bowl body.

30. The mixer bowl of claim 29 wherein auxiliary mounting bracket coupled to said bowl body separately from said mounting bracket.

31. The mixer of claim 29 wherein said auxiliary mounting bracket is coupled to said mounting bracket via a coupling member.

32. The mixer bowl of claim 29 wherein at least one of said opening of said mounting bracket and said opening of said auxiliary mounting bracket is less than full enclosed.

33. The mixer bowl of claim 29 wherein at least one of said opening of said mounting bracket and said opening of said auxiliary mounting bracket is configured as a slot.

34. A mixer system comprising:
   a bowl for receiving a material to be mixed, said bowl having a central axis;
   a mixer body having an output component that is rotatable about an output axis;
   a hinge, said bowl being pivotable about said hinge relative to said mixer body such that said bowl can be pivoted between a loading/unloading position and a closed position relative said mixer body, and wherein said hinge supports said bowl during said pivoting such that said central axis of said bowl is generally parallel to said rotation axis when said bowl is in said loading/unloading position;
   a protrusion located on said bowl; and
   a protrusion located on said mixer body, wherein said bowl protrusion is shaped and located to be positioned adjacent to said mixer body protrusion when said bowl is in said closed position to prevent said bowl from pivoting from said closed position to said loading/unloading position;
   wherein at least one of said protrusions is defined by a sidewall of a recess.

35. The mixer system of claim 34 wherein said recess is located on said mixer body and defines another sidewall spaced apart from said sidewall such that said bowl protrusion can be received between said sidewalls.

36. The mixer system of claim 34 wherein said hinge is configured to permit said bowl to be lifted sufficiently to allow said bowl protrusion to be lifted above said mixer body protrusion to allow said bowl to pivot from said closed position to said loading/unloading position.

37. A mixer bowl including a bowl body having an upper edge, a bracket arrangement extending from a first outer side portion of said bowl body, the bracket arrangement including a first portion having a first mount opening and a second portion having a second mount opening, said first mount opening being vertically spaced from and generally aligned with said second mount opening to define an upright pivot axis of said mixer bowl, wherein said bracket arrangement is fixed to said bowl body in a stationary manner, wherein said bracket arrangement is generally open at its exterior side in a vertical space between said first portion and said second portion, a locking bracket extending from a second outer side portion of said bowl body, said second outer side portion is substantially diametrically opposite said first outer side portion, a protrusion extending from a third outer side portion of said bowl body, said third outer side portion is spaced circumferentially from both said first outer side portion and said second outer side portion, a first handle extending outward from said bowl body and a second handle extending outward from said bowl body.

38. The mixer bowl of claim 37 wherein said locking bracket has a lower support surface that faces downwardly and a ramp surface that faces downwardly at an angle relative to said lower surface, said ramp surface extends upward from said lower surface at a side edge thereof that faces in a direction toward said third side portion of said bowl.

39. The mixer bowl of claim 37 wherein said first handle and said second handle are substantially diametrically opposed to each other.

40. The mixer bowl of claim 37 wherein the bracket arrangement comprises a mounting bracket and an auxiliary mounting bracket that are separately coupled to the bowl body.

41. The mixer bowl of claim 37 wherein said bracket arrangement comprises a mounting bracket and auxiliary mounting bracket that are coupled to each other.

42. The mixer bowl of claim 37 wherein said first handle and said second handle are located higher on said bowl body than said bracket arrangement and said locking bracket.

43. The mixer bowl of claim 37 wherein at least one of said first mount opening and said second mount opening is less than full enclosed.

44. The mixer bowl of claim 37 wherein at least one of said first mount opening and said second mount opening is configured as a slot.

45. The mixer bowl of claim 44 wherein said auxiliary mounting bracket is coupled to said mounting bracket via a coupling member.

* * * * *

UNITED STATES PATENT AND TRADEMARK OFFICE
CERTIFICATE OF CORRECTION

| | |
|---|---|
| PATENT NO. | : 6,966,691 B2 |
| DATED | : November 22, 2005 |
| INVENTOR(S) | : Brian A. Brunswick et al. |

It is certified that error appears in the above-identified patent and that said Letters Patent is hereby corrected as shown below:

<u>Column 13,</u>
Line 32, insert -- side -- before "portion".

Signed and Sealed this

Seventh Day of February, 2006

JON W. DUDAS
*Director of the United States Patent and Trademark Office*